(12) United States Patent
Blythe

(10) Patent No.: US 8,274,518 B2
(45) Date of Patent: Sep. 25, 2012

(54) SYSTEMS AND METHODS FOR VIRTUALIZING GRAPHICS SUBSYSTEMS

(75) Inventor: David R. Blythe, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 685 days.

(21) Appl. No.: 11/026,380

(22) Filed: Dec. 30, 2004

(65) Prior Publication Data

US 2006/0146057 A1 Jul. 6, 2006

(51) Int. Cl.
*G06T 1/00* (2006.01)
(52) U.S. Cl. ........................................ 345/522
(58) Field of Classification Search .................. 345/522
See application file for complete search history.

(56) References Cited

U.S. PATENT DOCUMENTS

| | | | |
|---|---|---|---|
| 5,774,720 A * | 6/1998 | Borgendale et al. ........... | 719/329 |
| 5,930,827 A | 7/1999 | Sturges .......................... | 711/170 |
| 6,061,659 A | 5/2000 | Murray | |
| 6,222,564 B1 | 4/2001 | Sturges .......................... | 345/531 |
| 6,477,612 B1 | 11/2002 | Wang .............................. | 711/2 |
| 6,496,847 B1 * | 12/2002 | Bugnion et al. .................. | 718/1 |
| 6,496,912 B1 | 12/2002 | Fields, Jr. et al. ............ | 711/170 |
| 6,518,973 B1 | 2/2003 | Blythe ........................... | 345/564 |
| 6,650,333 B1 | 11/2003 | Baldwin ........................ | 345/552 |
| 6,677,964 B1 * | 1/2004 | Nason et al. .................... | 715/764 |
| 6,956,579 B1 | 10/2005 | Diard et al. | |
| 2003/0140179 A1 | 7/2003 | Wilt et al. ..................... | 719/321 |
| 2004/0268135 A1 * | 12/2004 | Zimmer et al. ................ | 713/189 |
| 2005/0108715 A1 * | 5/2005 | Kanai et al. .................... | 718/100 |
| 2005/0185207 A1 | 8/2005 | Mitani | |
| 2005/0262568 A1 * | 11/2005 | Hansen et al. .................. | 726/26 |

FOREIGN PATENT DOCUMENTS

| | | |
|---|---|---|
| CN | 1227370 A | 9/1999 |
| CN | 1264078 A | 8/2000 |
| EP | 0927389 B1 | 1/2003 |
| JP | 6-214813 A | 8/1994 |
| JP | 11-3236 A | 1/1999 |
| JP | 2002-182560 A | 6/2002 |
| RU | 2192040 C2 | 10/2002 |
| RU | 2193228 C2 | 11/2002 |

(Continued)

OTHER PUBLICATIONS

U.S. Appl. No. 10/748,362, filed Dec. 30, 2003, Gosalia et al.

(Continued)

*Primary Examiner* — Aaron M Richer
(74) *Attorney, Agent, or Firm* — Woodcock Washburn LLP

(57) ABSTRACT

Systems and methods for applying virtual machines to graphics hardware are provided. In various embodiments of the invention, while supervisory code runs on the CPU, the actual graphics work items are run directly on the graphics hardware and the supervisory code is structured as a graphics virtual machine monitor. Application compatibility is retained using virtual machine monitor (VMM) technology to run a first operating system (OS), such as an original OS version, simultaneously with a second OS, such as a new version OS, in separate virtual machines (VMs). VMM technology applied to host processors is extended to graphics processing units (GPUs) to allow hardware access to graphics accelerators, ensuring that legacy applications operate at full performance. The invention also provides methods to make the user experience cosmetically seamless while running multiple applications in different VMs. In other aspects of the invention, by employing VMM technology, the virtualized graphics architecture of the invention is extended to provide trusted services and content protection.

21 Claims, 11 Drawing Sheets

FOREIGN PATENT DOCUMENTS

WO   WO 98/55953 A1   12/1998

OTHER PUBLICATIONS

U.S. Appl. No. 10/777,797, filed Feb. 12, 2004, Pronovost et al.

U.S. Appl. No. 10/836,890, filed Apr. 30, 2004, Goossen et al.

Burgess, P. et al., "BED:A Multithread Kernel for Embedded Systems", *Real Time Programming, IFAC Workshop*, 1994, 133-138.

Jones, M.B. et al., "CPU Reservations and time Constraints: Efficient, Predictable Scheduling of Independent Activities", http://research.microsoft.com/~mbj/papers/sosp97/sosp97.html, Feb. 24, 2004, 24 pages.

Kalavade, A. et al., "AsaP—A Framework for Evaluating Run-time Schedulers in Embedded Multimedia End-Systems", *ACM*, 1998, 291-296.

Kane, J. et al., "18 Graphics Cards Quick on the Draw", *BYTE/NSTL Lab Report*, Feb. 1996, 142-151.

Macedonia, M., "The GPU Enters Computing's Mainstream", *Computer*, Oct. 2003, 36(10), 106-108.

Musiari, F., "µPD7220 Graphic Display Controller I° Parte", *Elettronica OGGI*, 1982, 105-111.

Nieh, J. et al., "A SMART Scheduler for Multimedia Applications", *ACM Transactions on Computer Systems*, May 2003, 21(2), 117-163.

Petrot, F. et al., "Lightweight Implementation of the POSIX Threads API for an On-Chip MIPS Multiprocessor with VCI Interconnect", *Proceedings Design, Automation and Test in Europe Conference and Exhibition*, Mar. 3-7, 2003, Munich, Germany, 51-56.

Poellabauer, C. et al., "Coordinated CPU and Event Scheduling for Distributed Multimedia Applications", *MM*, 2001, 231-240.

Tivo® Remote Control, Hints and Shortcuts, Inserting Batteries in the remote Control, Setting up the Remote to Control your TV, The TiVo Menus and the remote Control, 2 Pages.

Waldspurger, C.A., "Memory Resource Management in VMware ESX Server", *5th Symposium on Operating Systems Design and Implementation(OSDI)*,Dec. 9-11, 2002, 181-194.

Wong, W., "Optimizing Graphics Performance for Portable Computers", *Wescon Conference Record*, Anaheim Convention Center, Nov. 17-19, 1992, 121-123.

"Time Studio, Post & Telecom Press," Vmware Workstation Typlical Application Skills, Nov. 30, 2003, downloaded Jul. 1, 2009, 18 pages.

Dencker, Kjartan, "Cloth Modelling on the GPU," at http://ntnu.diva-portal.org/smash/get/diva2:349022/FULLTEXT01, Jun. 2006, 1-93.

\* cited by examiner

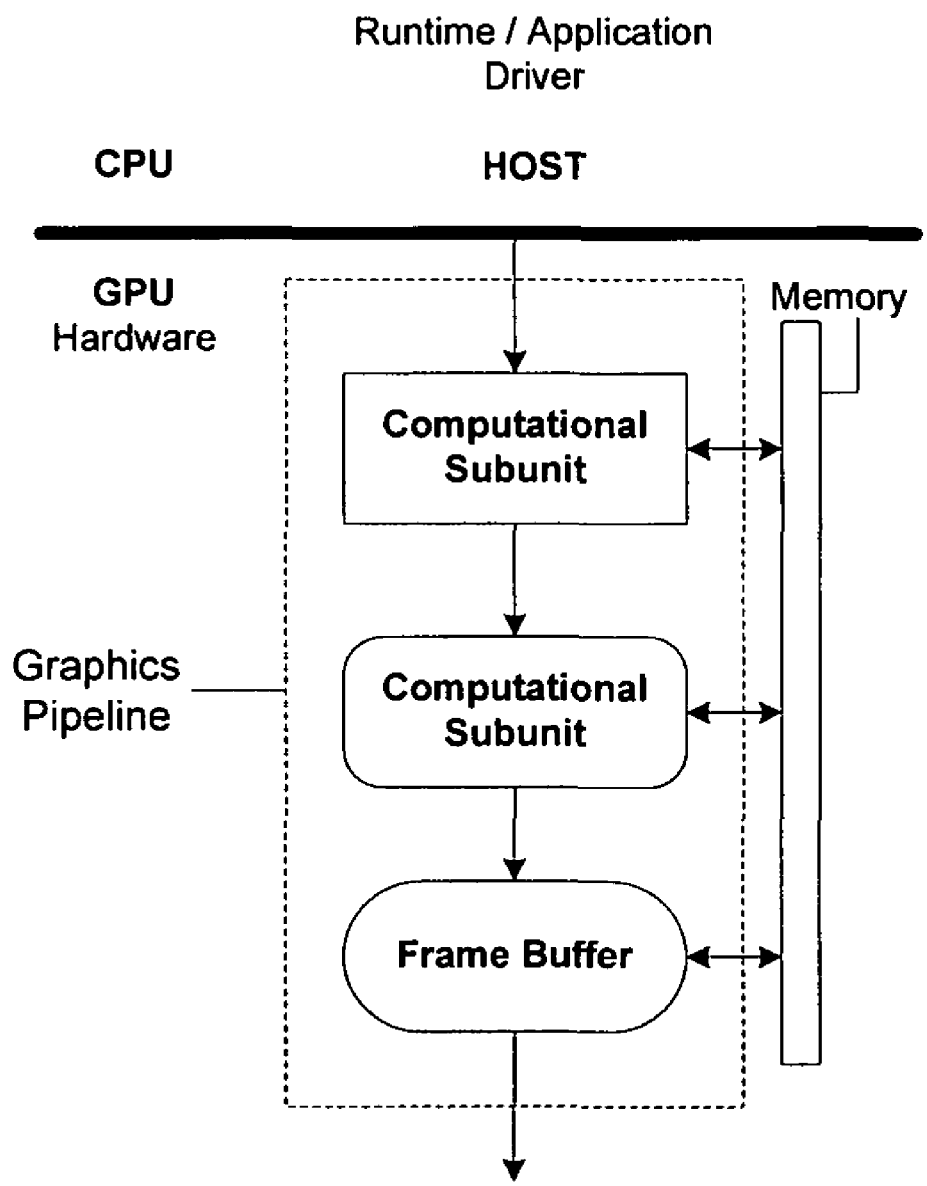
FIG. 1 – Prior Art

SYSTEMS AND METHODS FOR VIRTUALIZING GRAPHICS SUBSYSTEMS

COPYRIGHT NOTICE AND PERMISSION

A portion of the disclosure of this patent document may contain material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice shall apply to this document: Copyright© 2004, Microsoft Corp.

FIELD OF THE INVENTION

The present invention is directed to systems, apparatus, methods, user interfaces, protocols and application programming interfaces (APIs) for virtualizing graphics subsystems of computing devices. More particularly, the invention is directed to virtualized graphics architectures that provide benefits related to compatibility, security and digital rights management.

BACKGROUND

By way of background concerning the state of the modern graphics pipeline, a graphics subsystem generally cooperates with a host computer to perform certain specialized tasks on its behalf, e.g., tasks that require, relatively speaking, a lot of raw computational power such as preparing the output of an application for display on a monitor, or printer, or other device. To create a 3-D computer graphical representation, for instance, objects to be depicted are represented as mathematical models within the computer, which are well suited for mathematically intensive processing by the graphics processing unit (GPU) of the graphics subsystem. For instance, 3-D models can be made up of geometric points within a coordinate system consisting of an x, y and z axis, for example, corresponding to width, height, and depth, respectively. Objects are defined by a series of points, called vertices. The location of a point, or vertex, is defined by its x, y and z coordinates (or other coordinate system). In graphics terminology, one vertex is a point, two vertices define a line, or a line segment, and three vertices define a triangle where all three are "primitives." When three or more of these points are connected, a polygon is formed, with the triangle being the simplest polygon, which can be used to approximate the 3-D geometry of an object and apply graphics data to the 3-D geometry to create a variety of artistic and realistic effects and color transformations. The graphics pipeline, using its various computational subunits, can process vertices and other streams of data very fast and efficiently to ultimately represent very complex 3-D objects in 2-D display space.

Thus, certain tasks, such as rendering and displaying three dimensional (3-D) graphics on screen, typically involve many calculations and computations that are well suited to be carried out by a graphics subsystem. In a simple graphics system, such computations occur according to some level of cooperative or shared processing by the central processing unit (CPU) and the graphics processing unit (GPU). In an exemplary scenario, after instructions are processed and some initial computations occur in the CPU, a set of coordinate points or vertices that define the object to be rendered are stored in video memory for further processing by the GPU in the graphics pipeline. If the data is 3-D graphics data, for instance, a tessellator may break the graphics data down into simple polygons according to predetermined algorithms designed to efficiently cover the surface of the object being represented—a process known as tessellation. Currently, in most graphics pipelines, the data may then be operated upon by one or more computational subunits of a GPU, such as procedural shaders, depending upon the instructions that are delivered to the GPU, which in cooperation with video memory, i.e., the frame buffer, processes the data according to the work instructions for the data, and outputs the data where appropriately directed, e.g., to a display or printer device.

As illustrated in FIG. 1, with respect to computing systems having graphics coprocessing systems, computing systems are divided between the host CPU and the graphics hardware. The CPU facilitates the making of calls to graphics APIs by applications and services requesting their use. Conventionally, the application and drivers are located on the CPU side and information from those sources is sent as work items to the graphics pipeline, such as displaying data on a monitor. First, the information is sent from the CPU to the GPU, as packaged by the CPU according to APIs. Then, the information from the application waits in memory until it is scheduled and processed by computational subunits of the GPU, such as the vertex shader(s) if 3-D graphics data is being processed. After the vertex shader(s) conclude their operations, the information is typically output from the vertex shader(s) through a special data path to the pixel shader(s) until it is accessed by the pixel shader(s) for further processing. After the pixel shader(s) have performed their operations, the information is placed in a frame buffer to be scanned out to a display, or sent back to the host for further operation.

The term "frame buffer" in today's graphics architectures generally refers to any memory (generally video memory included for interoperation with the GPU) used in connection with rasterization and/or digital to analog converter (DAC)-out processes. In this regard, though the term rasterization is sometimes used more generally, the processing performed in connection with pixel processing or setup engine processing in the graphics pipeline is generally referred to as rasterization. Scan-out or DAC-out, on the other hand, is the process of transmitting signals to a monitor or LCD based on the contents of the frame buffer.

Due to the specialization of the task and the computational resources implicated, graphics subsystems of computer systems are commonly used for displaying graphical objects on a display screen. The purpose of three dimensional (3-D) computer graphics is generally to create two-dimensional (2-D) images on a computer screen that realistically represent an object or objects in three dimensions. In the real world, objects occupy three dimensions having a real height, a real width and a real depth. A photograph is an example of a 2-D representation of a 3-D space. 3-D computer graphics are generally like a photograph in that they represent a 3-D world on the 2-D space of a computer screen, except the underlying image is generally modeled with 3-D geometry and surface textures.

Images created with 3-D computer graphics are used in a wide range of applications, from video entertainment games to aircraft flight simulators, to portray in a realistic manner an individual's view of a scene at a given point in time. Well-known examples of 3-D computer graphics include special effects in Hollywood films such as Terminator II, Jurassic Park, Toy Story and the like. One industry that has seen a particularly tremendous amount of growth in the last few years is the computer game industry and the current generation of computer games apply 3-D graphics techniques in an ever increasing fashion. At the same time, the speed of play is driven faster and faster. This combination has fueled a genuine need for rapid and flexible rendering of 3-D graphics in relatively inexpensive systems.

In accordance with these rapidly moving trend lines associated with graphics subsystems, however, compatibility, security and rights management have correspondingly evolved as issues. As each new generation of GPUs and associated hardware supplants the previous generation, in addition to the hardware, the interfaces to the pipeline (e.g., DirectX8, DirectX9, GDI, GDI+, etc.) have to evolve, and if they are expected to handle calls to "old" interfaces, then separate code need be written that ensures support for older hardware. After more than a few generations, the likelihood that the graphics interface code of any one particular operating system remains manageable decreases, and the likelihood for errors in handling due to incompatible function calls increases as the effects of compatibility code fan-out become rooted. An additional problem is that entirely separate "strains" of graphics interface code develop by virtue of the existence of different operating systems, or platforms (Macintosh, Linux, Windows, etc.), or even different strains included on the same platform (e.g., OpenGL, GDI+, DirectX, etc.). Thus, there remain problems whereby different versions of operating systems, graphics interfaces, and associated hardware may not all be co-supported, and these problems are becoming more complicated over time. It would be desirable to alleviate this problem without having to modify the core code provided with any particular operating system or set of interfaces.

With the same backdrop, the problems of security and content protection/digital rights management (DRM) are becoming more complicated to solve in connection with the graphics pipeline. With different operating systems, interfaces and hardware, there is no common mechanism that enforces data security or enforces protection of content/digital rights management conditions across all known pipelines. Thus, there is desired a common way or layer for addressing concerns over security of data and/or DRM that works independently of the graphics pipeline.

It would thus be desirable to virtualize the graphics pipeline of a computer system by providing a virtual machine as a layer of interaction of between the host processor and the GPU. It would be further desirable to implement systems and methods that overcome the shortcomings of present compatibility, security and content protection/DRM issues that are encountered when various versions of operating systems or interfaces or various architectures of GPUs are utilized.

SUMMARY OF THE INVENTION

In consideration of the above-identified and other shortcomings of the art, the present invention provides systems and methods for applying virtual machines to the graphics hardware space. In various embodiments of the invention, while supervisory code runs on the CPU, the actual graphics work items are run directly on the graphics hardware. In one non-limiting embodiment, the supervisory code is structured as a graphics virtual machine monitor.

Application compatibility is retained using virtual machine monitor (VMM) technology to run a first operating system (OS), such as an original OS version, simultaneously with a second OS, such as a new version OS, in separate virtual machines (VMs). In one embodiment, VMM technology applied to host processors is extended to graphics processing units (GPUs) to allow hardware access to graphics accelerators, ensuring that legacy applications operate at full performance. The invention also provides methods to make the user experience cosmetically seamless while running multiple applications in different VMs. In other aspects of the invention, by employing VMM technology, the virtualized graphics architecture of the invention is extended to provide trusted services and content protection.

Other advantages and features of the invention are described below.

BRIEF DESCRIPTION OF THE DRAWINGS

The systems and methods for virtualizing GPUs in accordance with the present invention are further described with reference to the accompanying drawings in which:

FIG. 1 is a block diagram illustrating a prior art implementation of a graphics pipeline;

DETAILED DESCRIPTION OF THE ILLUSTRATIVE EMBODIMENT

Overview

Figure 2A:
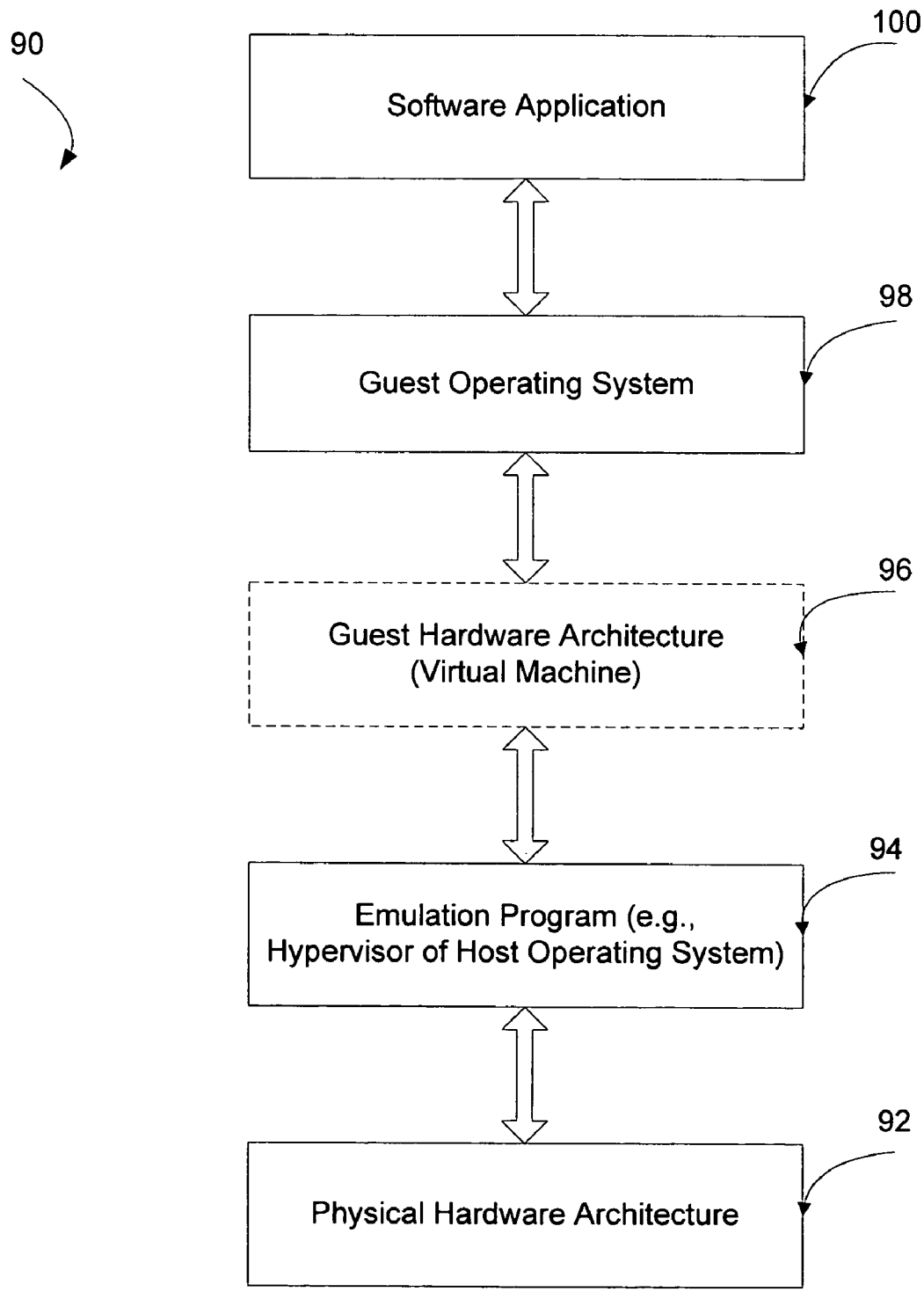
FIG. 2A is a block diagram representing the logical layering of the hardware and software architecture for an emulated operating environment in a computer system.

As mentioned, the present invention provides systems and methods for applying virtual machines to the graphics hardware space. In various embodiments of the invention, while supervisory code, such as a graphics virtual machine monitor, runs on the CPU, the actual graphics work items are run directly on the graphics hardware.

In one non-limiting aspect of the invention, systems and methods are provided for separating graphics hardware functions into privileged and non-privileged operations and for efficiently virtualizing the privileged operations, while maintaining a seamless user experience. In another non-limiting aspect of the invention, efficient virtualization of hardware interrupt processing is achieved. In further aspects, the invention provides resource management capabilities in the emulation layer for assigning pre-fixed allocation of resources, such as memory, processing cycles, screen real estate, etc., to partitions and/or for dynamically assigning such resources according to the cross application and cross platform parameters/needs of the system.

Another beneficial result of the architecture is that the present invention allows a virtual partition to have direct access to the graphics hardware without requiring changes to the guest Operating System or applications. Many applications also derive from the basic architecture of the invention. For example, legacy code can be left in old Operating Systems using an instance of the legacy Operating System for execution of applications dependent on the legacy code. Another example is the idea of building trusted and untrusted services, which in turn can be used to support trusted graphics output or content protection techniques.

Other systems and methods provided in accordance with the invention pertain to the user experience. With multiple partitions, one user experience provided by the invention is the "desktop in a window" approach where the displayed desktop for each guest Operating System is redirected to a window (or alternate desktop view) on the display device (or multiple display devices in the case of multiple monitors, sometimes known as "multimon"). In other embodiments, the invention enables a user experience that allows the windows from different guest Operating Systems to be intermixed in a single unified display, whereby the "pixels" associated with any particular window are identified. In one embodiment, the invention achieves identifying pixels and their window associations by adding "helper programs" to the guest operating systems to identify the parts of various windows. In other embodiments, the invention enables interaction with the guest "window manager" to ensure that unoccluded windows in the main desktop are unoccluded in the virtual guest Operating Systems desktop so that they can be extracted and displayed in the main desktop. In other embodiments, graphics hardware support is provided to partly or entirely help identify memory locations of pixels from different windows.

The invention also includes embodiments providing additional graphics hardware support to assist in managing the windows on the virtual desktop. While an area where future Operating Systems can add support to make this task easier, the idea is to enable a framework that identifies individual windows from different guest Operating Systems and to make that data available to a unified presentation service (also sometimes referred to as a desktop composition engine) that composes the multiple sources. This engine has access to the graphics memory state from multiple guests, whereas guests normally cannot see one another's function calls and activities.

One approach that enables complex layered composition effects in the display output relative to the content of the respective Guest OSs is to have a presentation engine "pull" window content from different Guest OSs in order to build the composite desktop. An alternate approach is to allow Guest OSs to render directly to a single main desktop, i.e., render to that memory, but use special hardware support to constrain the parts of the desktop to which the Guest OSs can draw. For instance, the allowable regions can be controlled using a separate privileged mechanism similar to the mechanism used for hardware window clipping wherein a list of rectangles, or a bitmap, defines a mask that indicates which pixels are writable. One could implement this as a "push" operation where the Guest OSs draw directly to the desktop and the presentation engine controls where the writeable region(s) are for each Guest OS.

In various other embodiments, the invention provides systems and methods for identifying and locating pixels from windows rendered by a first OS and windows rendered by a second OS and presenting the windows either one-at-a-time or combined together in some fashion for display. The invention also includes systems and methods for allocating and assigning physical resources, such as video or system memory, to a second OS such that assigned resources are directly accessible and unassigned resources are not accessible by the second OS. The invention further provides systems and methods for intercepting and efficiently emulating privileged operations.

Other more detailed aspects of the invention are described below, but first, the following description provides a general overview of and some common vocabulary for virtual machines and associated terminology as the terms have come to be known in connection with operating systems and the host processor ("CPU") virtualization techniques. In doing so, a set of vocabulary is set forth that one of ordinary skill in the art may find useful for the description that follows of the apparatus, systems and methods for providing emulation capabilities for the graphics subsystem side of computing systems in accordance with the invention.

Overview of Virtual Machines

Computers include general purpose central processing units (CPUs) or "processors" that are designed to execute a specific set of system instructions. A group of processors that have similar architecture or design specifications may be considered to be members of the same processor family. Examples of current processor families include the Motorola 680X0 processor family, manufactured by International Business Machines (IBM) or Motorola, Inc. of Phoenix, Ariz.; the Intel 80X86 processor family, manufactured by Intel Corporation of Sunnyvale, Calif.; and the PowerPC processor family, which is manufactured by Motorola, Inc. and used in computers manufactured by Apple Computer, Inc. of Cupertino, Calif. Although a group of processors may be in the same family because of their similar architecture and design considerations, processors may vary widely within a family according to their clock speed and other performance parameters.

Each family of microprocessors executes instructions that are unique to the processor family. The collective set of instructions that a processor or family of processors can execute is known as the processor's instruction set. As an example, the instruction set used by the Intel 80X86 processor family is incompatible with the instruction set used by the PowerPC processor family. The Intel 80X86 instruction set is based on the Complex Instruction Set Computer (CISC) format. The Motorola PowerPC instruction set is based on the Reduced Instruction Set Computer (RISC) format. CISC processors use a large number of instructions, some of which can perform rather complicated functions, but which require generally many clock cycles to execute. RISC processors use a smaller number of available instructions to perform a simpler set of functions that are executed at a much higher rate.

The uniqueness of the processor family among computer systems also typically results in incompatibility among the other elements of hardware architecture of the computer systems. A computer system manufactured with a processor from the Intel 80X86 processor family will have a hardware architecture that is different from the hardware architecture of a computer system manufactured with a processor from the PowerPC processor family. Because of the uniqueness of the processor instruction set and a computer system's hardware architecture, application software programs are typically written to run on a particular computer system running a particular operating system.

Generally speaking, computer manufacturers try to maximize their market share by having more rather than fewer applications run on the microprocessor family associated with the computer manufacturers' product line. To expand the number of operating systems and application programs that can run on a computer system, a field of technology has developed in which a given computer having one type of CPU, called a host, will include a virtualizer program that allows the host computer to emulate the instructions of an unrelated type of CPU, called a guest. Thus, the host computer will execute an application that will cause one or more host instructions to be called in response to a given guest instruction, and in this way the host computer can both run software designed for its own hardware architecture and software written for computers having an unrelated hardware architecture.

As a more specific example, a computer system manufactured by Apple Computer, for example, may run operating systems and programs written for PC-based computer systems. It may also be possible to use virtualizer programs to execute concurrently on a single CPU multiple incompatible operating systems. In this latter arrangement, although each operating system is incompatible with the other, virtualizer programs can host each of the several operating systems and thereby allowing the otherwise incompatible operating systems to run concurrently on the same host computer system.

When a guest computer system is emulated on a host computer system, the guest computer system is said to be a "virtual machine" as the guest computer system only exists in the host computer system as a pure software representation of the operation of one specific hardware architecture. The terms virtualizer, emulator, direct-executor, virtual machine, and processor emulation are sometimes used interchangeably to denote the ability to mimic or emulate the hardware architecture of an entire computer system using one or several approaches known and appreciated by those of skill in the art. Moreover, all uses of the term "emulation" in any form is intended to convey this broad meaning and is not intended to distinguish between instruction execution concepts of emulation versus direct-execution of operating system instructions in the virtual machine. Thus, for example, the Virtual PC software created by Connectix Corporation of San Mateo, Calif. "emulates" (by instruction execution emulation and/or direct execution) an entire computer that includes an Intel 80X86 Pentium processor and various motherboard components and cards, and the operation of these components is "emulated" in the virtual machine that is being run on the host machine. A virtualizer program executing on the operating system software and hardware architecture of the host computer, such as a computer system having a PowerPC processor, mimics the operation of the entire guest computer system.

The general case of virtualization allows one processor architecture to run OSes and programs from other processor architectures (e.g., PowerPC Mac programs on x86 Windows, and vice versa), but an important special case is when the underlying processor architectures are the same (run various versions of x86 Linux or different versions of x86 Windows on x86). In this latter case, there is the potential to execute the Guest OS and its applications more efficiently since the underlying instruction set is the same. In such a case, the Guest instructions are allowed to execute directly on the processor without losing control or leaving the system open to attack (i.e., the Guest OS is sandboxed). As described in detail below, this is where the separation of privileged versus non-privileged and the techniques for controlling access to memory comes into play. For virtualization where there is an architectural mismatch (PowerPC <-> x86), two approaches could be used: instruction-by-instruction emulation (relatively slow) or translation from the Guest instruction set to the native instruction set (more efficient, but uses the translation step). If instruction emulation is used, then it is relatively easy to make the environment robust; however, if translation is used, then it maps back to the special case where the processor architectures are the same.

In accordance with the invention, the graphics platforms are virtualized and thus an exemplary scenario in accordance with the invention applying to graphics architectures would be emulation of an ATI card using NVidia hardware. For the graphics virtualization case, in various embodiments, the invention focuses on direct execution of commands from the same graphics architecture. In the graphics context, the equivalent of translation does not really exist, or rather emulation and translation amount to the same thing. Translation works on the processor because once the code is translated, the code can be executed multiple times, thereby amortizing the translation cost. However, due to the way graphics applications are structured, the equivalent of a program to translate (ignoring shaders) does not necessarily exist. Instead, the command stream (list of work items) is constantly regenerated so there isn't necessarily any reuse that can amortize the translation cost. In a more complex embodiment, lists of work items could be examined to determine if they match a pre-translated list.

As described in various embodiments below, in accordance with various embodiments of the invention, virtualizing while directly executing Guest instructions (either from translation or because the same processor architecture is implicated) has a performance benefit if the security of the system can be maintained. In various embodiments, the invention thus describes systems and methods for controlling Guest access to some or all of the underlying physical resources (memory, devices, etc.).

The virtualizer program acts as the interchange between the hardware architecture of the host machine and the instructions transmitted by the software (e.g., operating systems, applications, etc.) running within the emulated environment. This virtualizer program may be a host operating system (HOS), which is an operating system running directly on the physical computer hardware (and which may comprise a hypervisor, discussed in greater detailed later herein). Alternately, the emulated environment might also be a virtual machine monitor (VMM) which is a software layer that runs directly above the hardware, perhaps running side-by-side and working in conjunction with the host operating system, and which can virtualize all the resources of the host machine (as well as certain virtual resources) by exposing interfaces that are the same as the hardware the VMM is virtualizing. This virtualization enables the virtualizer (as well as the host computer system itself) to go unnoticed by operating system layers running above it.

Processor emulation thus enables a guest operating system to execute on a virtual machine created by a virtualizer running on a host computer system comprising both physical hardware and a host operating system.

From a conceptual perspective, computer systems generally comprise one or more layers of software running on a foundational layer of hardware. This layering is done for reasons of abstraction. By defining the interface for a given layer of software, that layer can be implemented differently by other layers above it. In a well-designed computer system, each layer only knows about (and only relies upon) the immediate layer beneath it. This allows a layer or a "stack" (multiple adjoining layers) to be replaced without negatively impacting the layers above said layer or stack. For example, software applications (upper layers) typically rely on lower levels of the operating system (lower layers) to write files to some form of permanent storage, and these applications do not need to understand the difference between writing data to a floppy disk, a hard drive, or a network folder. If this lower layer is replaced with new operating system components for writing files, the operation of the upper layer software applications remains unaffected.

The flexibility of layered software allows a virtual machine (VM) to present a virtual hardware layer that is in fact another software layer. In this way, a VM can create the illusion for the software layers above it that the software layers are running on their own private computer system, and thus VMs can allow multiple "guest systems" to run concurrently on a single "host system." This level of abstraction is represented by the illustration of FIG. 2A.

FIG. 2A is a diagram representing the logical layering of the hardware and software architecture for an emulated operating environment in a computer system. In the figure, an emulation program 94 runs directly or indirectly on the physical hardware architecture 92. Emulation program 94 may be (a) a virtual machine monitor that runs alongside a host operating system, (b) a specialized host operating system having native emulation capabilities, or (c) a host operating system with a hypervisor component wherein said hypervisor component performs said emulation. Emulation program 94 emulates a guest hardware architecture 96 (shown as broken lines to illustrate the fact that this component is the "virtual machine," that is, hardware that does not actually exist but is instead emulated by said emulation program 94). A guest operating system 98 executes on said guest hardware architecture 96, and software application 100 runs on the guest operating system 98. In the emulated operating environment of FIG. 2A—and because of the operation of emulation program 94—software application 100 may run in computer system 90 even if software application 100 is designed to run on an operating system that is generally incompatible with the host operating system and hardware architecture 92.

Figure 2B:
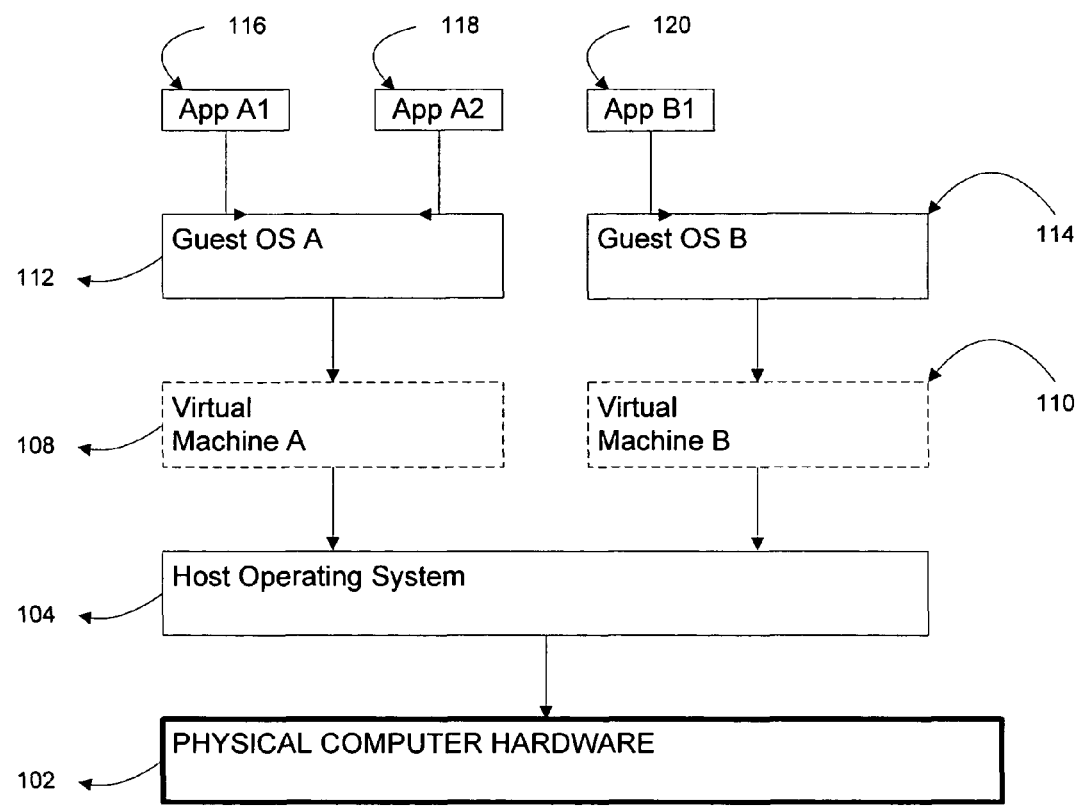
FIG. 2B is a block diagram representing a virtualized computing system wherein the emulation is performed by the host operating system (either directly or via a hypervisor)

FIG. 2B illustrates a virtualized computing system comprising a host operating system software layer 104 running directly above physical computer hardware 102 where the host operating system (host OS) 104 provides access to the resources of the physical computer hardware 102 by exposing interfaces that are the same as the hardware the host OS is emulating (or "virtualizing"—which, in turn, enables the host OS to go unnoticed by operating system layers running above it. Again, to perform the emulation the host operating system 102 may be a specially designed operating system with native emulations capabilities or, alternately, it may be a standard operating system with an incorporated hypervisor component for performing the emulation (not shown).

Referring again to FIG. 2B, above the host OS 104 are two virtual machine (VM) implementations, VM A 108, which may be, for example, a virtualized Intel 386 processor, and VM B 110, which may be, for example, a virtualized version of one of the Motorola 680X0 family of processors. Above each VM 108 and 110 are guest operating systems (guest OSs) A 112 and B 114 respectively. Running above guest OS A 112 are two applications, application A1 116 and application A2 118, and running above guest OS B 114 is application B1 120.

In regard to FIG. 2B, it is important to note that VM A 108 and VM B 110 (which are shown in broken lines) are virtualized computer hardware representations that exist only as software constructs and which are made possible due to the execution of specialized emulation software(s) that not only presents VM A 108 and VM B 110 to Guest OS A 112 and Guest OS B 114 respectively, but which also performs all of the software steps necessary for Guest OS A 112 and Guest OS B 114 to indirectly interact with the real physical computer hardware 102.

Figure 2C:
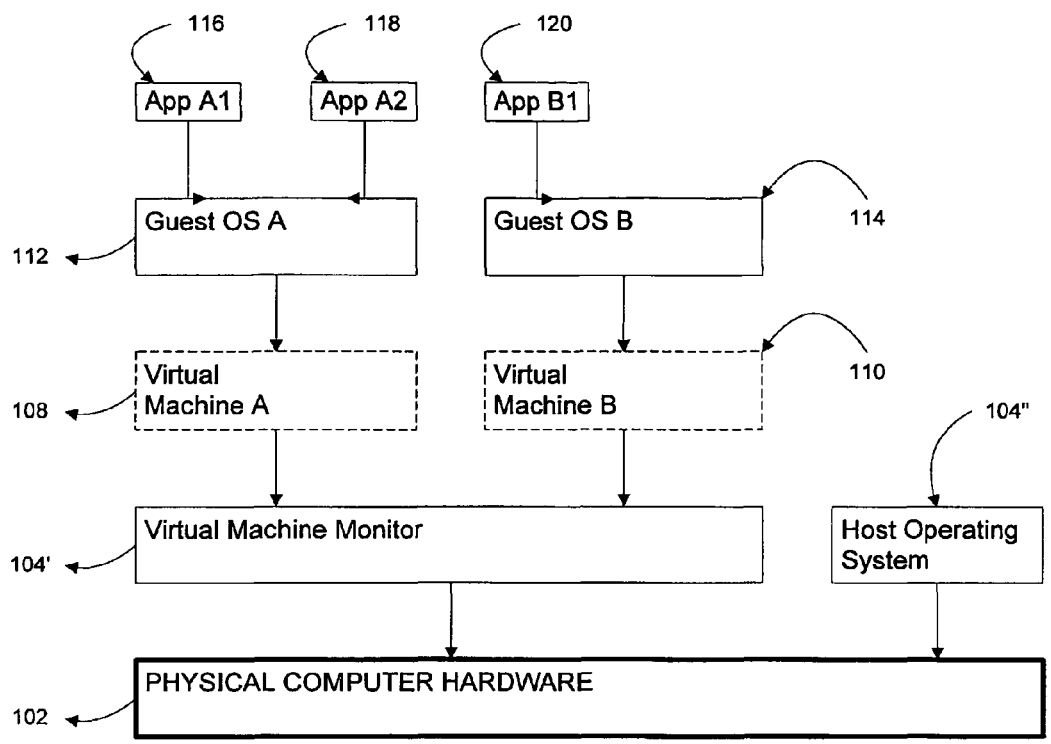
FIG. 2C is a block diagram representing an alternative virtualized computing system wherein the emulation is performed by a virtual machine monitor running side-by-side with a host operating system.

FIG. 2C illustrates an alternative virtualized computing system wherein the emulation is performed by a virtual machine monitor (VMM) 104' running alongside the host operating system 104". For certain embodiments the VMM may be an application running above the host operating system 104 and interacting with the computer hardware only through said host operating system 104. In other embodiments, and as shown in FIG. 2C, the VMM may instead comprise a partially independent software system that on some levels interacts indirectly with the computer hardware 102 via the host operating system 104 but on other levels the VMM interacts directly with the computer hardware 102 (similar to the way the host operating system interacts directly with the computer hardware). And in yet other embodiments, the VMM may comprise a fully independent software system that on all levels interacts directly with the computer hardware 102 (similar to the way the host operating system interacts directly with the computer hardware) without utilizing the host operating system 104 (although still interacting with said host operating system 104 insofar as coordinating use of said computer hardware 102 and avoiding conflicts and the like).

All of these variations for implementing the virtual machine are anticipated to form alternative embodiments of the present invention as described herein, and nothing herein should be interpreted as limiting the invention to any particular emulation embodiment. In addition, any reference to interaction between applications 116, 118, and 120 via VM A 108 and/or VM B 110 respectively (presumably in a hardware emulation scenario) should be interpreted to be in fact an interaction between the applications 116, 118, and 120 and the virtualizer that has created the virtualization. Likewise, any reference to interaction between applications VM A 108 and/or VM B 110 with the host operating system 104 and/or the computer hardware 102 (presumably to execute computer instructions directly or indirectly on the computer hardware 102) should be interpreted to be in fact an interaction between the virtualizer that has created the virtualization and the host operating system 104 and/or the computer hardware 102 as appropriate.

Systems and Methods for Virtualizing GPUs and the Graphics Pipeline

Figure 3A:
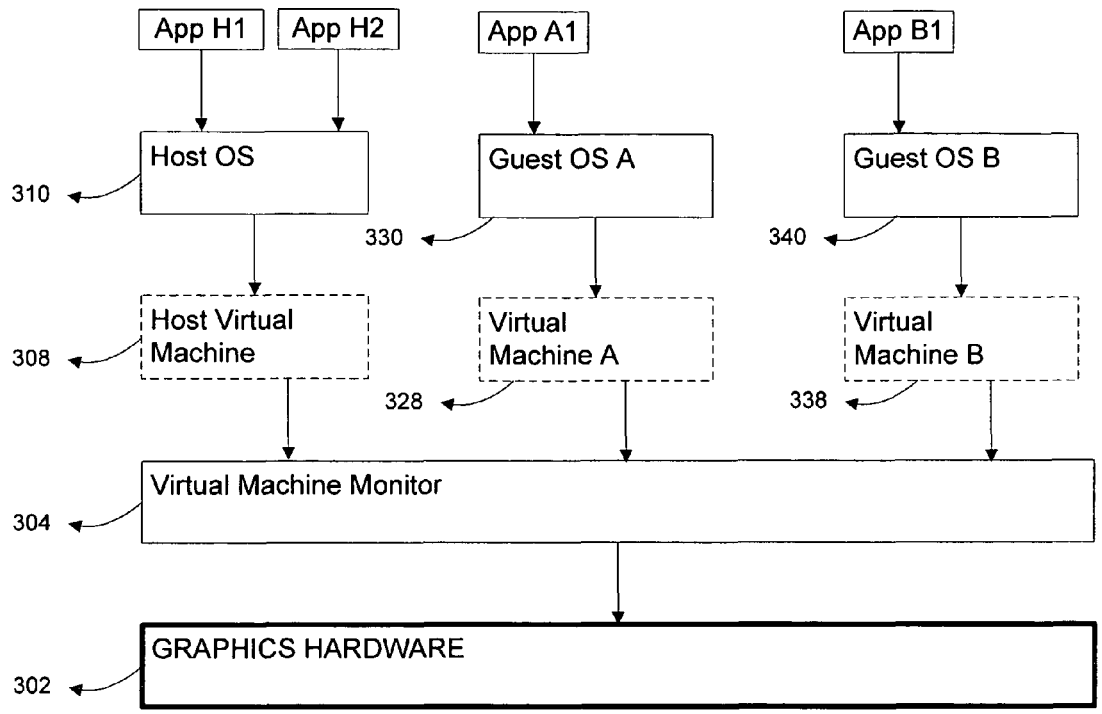
FIG. 3A illustrates a first non-limiting architecture for applying virtual machines to the graphics hardware space whereby supervisory code runs on the CPU, but the graphics work items are handled directly by the graphics hardware.

As mentioned, the present invention provides systems and methods for applying virtual machines to the graphics hardware space whereby supervisory code runs on the CPU, but the graphics work items are handled directly by the graphics hardware. FIG. 3A illustrates a first non-limiting architecture that illustrates some general concepts. For instance, as illustrated there is a virtual machine monitor 304 layered on top of the graphics hardware 302 of a computing device. In non-limiting fashion, this embodiment treats the host OS similar to a guest OS in that each receives a virtual machine. Host OS 310 running App H1 and App H2 is hosted by host virtual machine 308. Guest OS A 330 running App A1 is hosted by virtual machine A 328. Guest OS B 340 running App B1 is hosted by virtual machine B 338. In one non-limiting embodiment, the supervisory code is structured as a graphics virtual machine monitor.

It is a goal of the invention to provide continuing support for old graphics software in newer Operating Systems, and the various virtualized architectures of the invention achieve this goal. Solutions that carry the old functionality forward into the new Operating System merely complicate the new Operating System, a result to be avoided in accordance with the architectures of the invention. Solutions provided in accordance with the invention include running a virtual version of an old Operating System along with the new Operating System and only supporting the old graphics software in the old Operating System instance. This draws on the notion of virtual machines and virtual machine monitors, as described in the above section, and used in commercially available products like Virtual PC and VMware. However, in these PC based architectures, the graphics software in a virtual Operating System "partition" is often emulated and performs much more slowly than in the original non-virtualized implementation. Thus, in accordance with the invention, the graphics software stack is allowed to continue to have direct access to the underlying graphics hardware while running under the old (i.e., guest) operating system. This is similar to what is known as a Type II virtual machine monitor where a guest operating system can run directly on the processor without expensive emulation by the virtual machine monitor.

Support is required in the graphics hardware to allow multiple Operating System partitions execute on the graphics hardware unbeknownst to one another and unaware that the graphics hardware has been virtualized. Thus, in accordance with embodiments of the invention, a graphics virtual machine monitor manages resources and controls which partition is executing on the graphics hardware. Using the invention, multiple guest operating systems can run in parallel and each have (nearly) full-speed direct access to graphics hardware. Some guests can be legacy Operating Systems running older software, whereas other guests can do other specific tasks.

Extension of the invention leads to embodiments that provide secure processing, wherein secure processing can be run in either the "host" or "guest" operating systems. Achieving this in accordance with the invention is an advantageous effect of the robust and secure virtualization of the graphics hardware such that guest Operating Systems cannot interfere with one another. If guest Operating Systems cannot interfere with one another, then the possibility of rogue software operating unbeknownst to the user on a different guest Operating System is eliminated. The system treats the virtual machine monitor as a trusted base or "trusted kernel." In various embodiments of the invention, the trusted base can be extended into another guest (or the host) Operating System to provide additional trusted graphics services (rather than putting all services in the virtual machine monitor or kernel). These services can include control over what is visible on the display, for example, with a secure or trusted window manager or desktop composition engine. This allows a mix of applications to run in trusted and untrusted operating system partitions with unified output through a single (or multiple) physical graphics device.

The secure base can be further extended in accordance with the invention to provide a more robust system for enabling content protection, e.g., to uphold digital rights attached to a document, video, audio, etc. Such a system leverages the trusted services operating in the trusted virtual machine monitor and trusted partition(s) to enforce the digital rights. However, user interface and other functions in playback applications (media library management, playlists, etc.) can be separated and run in an untrusted partition communicating with the secure services in the trusted partitions.

As customers move to new operating systems and new operating system versions, compatibility has primarily been assured by diligently preserving obsolete software interfaces and behaviors, exacting an ever increasing penalty during development cycles. Design and implementation complexity increases and the risk of inadvertently breaking a legacy behavior persists throughout the development cycle. Accordingly, the invention proposes an alternate development strategy in which legacy behavior can be strategically and safely culled from new development while still protecting customer investments.

Application compatibility is retained using virtual machine monitor (VMM) technology to run the original OS version simultaneously with the new OS in separate virtual machines (VMs). The traditional VMM technology of a host machine is extended to graphics processing units (GPUs) to allow hardware access to graphics accelerators, ensuring that legacy applications operate at full performance. The invention also provides methods to make the user experience cosmetically seamless while running multiple applications in different VMs. In other aspects of the invention, by employing VMM technology, the virtualized graphics architecture of the invention is extended to provide trusted services and content protection/digital rights management.

Long term software success inevitably leads to legacy software interfaces and behaviors. The contradictory requirements of new software innovation and backward compatibility lead to more complex and time consuming software design cycles. Attempts to streamline the growing complexity by discarding select bits of legacy uses more resources to evaluate the decisions, adds risk if the wrong decisions are made, and invariably provides marginal relief. The net result is a glacial pace of innovation and delivery in core technologies and attention focuses on innovations that do not disturb the status quo.

An alternative approach is to embrace older versions of operating system software by carrying it forward while at the same time keeping it out of new development. The invention thus uses a virtual machine monitor to run previous OS versions simultaneously with the latest OS version in separate virtual machines, while simultaneously delivering a compelling user experience where, seamlessly or nearly seamlessly, applications using older versions of interfaces run in the same environments for which they were designed and behave the same way.

Before outlining the various embodiments of the invention, an example is instructive. Thus, assume that for a second version of an OS, say OS_B, it is desirable to be free of a certain set of graphics APIs supported in the first version of the OS, say OS_A. However, the goal is to run OS_B and OS_A simultaneously, i.e., applications using OS_A graphics interfaces run in the OS_A virtual "view" while new applications run in the OS_B view, both with equally "good" user experiences. Defining what constitutes a good user experience is a little nebulous, but some ground rules variously may include (A) seamless user input (keyboard, mouse, etc.) and application output (display, print, multimedia, etc.) when using either OS view, (B) little or no perceptible performance difference. One measure that can be applied is that the performance of any OS_A application running in the OS_A view should be within 5% of the same application running on a native first version of the OS without a virtual monitor and (C)

the OS_A virtual view should use unmodified software that is used for the first version of the OS. This is desirable, since once the door opens to allowing changes to guest operating systems, the risks of breaking compatibility re-emerges via fan-out described in the background. One way to relax this requirement is by allowing additional helper applications to run under the unmodified guest OS to facilitate the seamless operation.

One of the issues in providing minimal performance degradation in the user experience is providing hardware acceleration of graphics rendering services. For an API like the graphics device interface (GDI), it may be practical to emulate the entire stack in software, but for newer APIs that depend on hardware acceleration, the performance degradation may be unacceptable. One possibility is to redirect graphics processing requests from the Guest OS to the Host OS, for example, using software emulation/trapping of the low-level hardware interfaces of a well-known graphics hardware device.

While this traditional approach is successful for devices with a high-level of abstraction (lots of work per request) or simple devices (e.g., serial ports), it is not practical for modern graphics hardware. Trapping requests at this level is generally too inefficient (graphics hardware is designed to receive more than 1 GB/s of input data) and modern graphics hardware is generally too complicated to faithfully emulate at this level of detail (recall that a modern graphics device has ~200 million transistors). At one time, this approach might have been practical for a device with less than 10 million transistors and for less graphically intensive applications, but even under those circumstances, the degree of performance necessary would not be delivered.

Another choice is to intercept the graphics protocol stream at a higher (device-independent) point in the stream and redirect that to the Host OS. While this eliminates the problem by emulating a complex device, serious performance issues can result if high-bandwidth protocol streams are implicated. Another problem that might result pertains to the scenario where the protocol streams are not amenable to interception without significant changes to the Guest OS. One approach might be to replace system dynamic link libraries (DLLs) containing graphics APIs with protocol stubs to redirect to the Guest OS, though there are still significant issues with this approach when the methods for managing state in the original APIs have not been designed with this approach in mind. While any API that was designed to be remotely executed ("remoted") likely has reasonable behavior that could be used to achieve this, not all graphics and media APIs were designed with this solution in mind. Again, this approach requires modifying (replacing) system-level components and thus introduces compatibility risks.

The approach of the various embodiments of the invention is to push the problem into hardware and continue to allow the Guest OS to have direct hardware access reminiscent of VMM techniques used for the CPU. There are several advantages to this technique when efficiently implemented. The first is eliminating the need to make changes to the Guest OS. The second provides the same or highly similar performance levels as if the Guest OS were running natively on the hardware. It should also be noted that the scheme allows legacy OSes to support newer graphics hardware as long as graphics hardware vendors continue to ship driver support for the new hardware on legacy OSes. Thus, the various virtualized architectures of the invention, graphics hardware is built that can be virtualized, the Host OS & VMM are structured to efficiently exploit the hardware, and the presentation (display) is virtualized such that it can be integrated into a composite desktop.

The invention thus allows each VM access to graphics rendering resources, creates a VMM environment on the GPU, for end to end virtualization of the pipeline. In particular, this includes the idea of efficiently virtualizing the GPU for multiple graphics clients. In various embodiments, the virtualization architectures of the invention conform to one or more of the following requirements: a clearly defined execution state (context), low-latency context switching support, protected virtual address spaces, demand paged memory management, and privileged execution modes. These requirements are used to provide efficient, secure, and robust sharing of the GPU hardware resources amongst multiple clients (applications).

To simplify the virtualization discussion, it is helpful to summarize the degree of virtualization support that is contemplated in accordance with the invention. The simplest analogy is that roughly the same level of GPU sharing should be found that is found in a modern CPU for sharing the CPU amongst multiple clients (applications). This is a natural consequence of the evolution of the GPU—it is a powerful computational resource that should be efficiently shared between multiple independent clients. One difference from the CPU is that the GPU is managed by executable code running on the CPU rather than on the GPU. In some driver models, in contrast, the kernel graphics subsystem acts as a mini-executive providing scheduling and memory management services and control over global resources such as video display configuration, power management, etc. This mini-executive operates independently from the kernel executive, making its own scheduling and memory management decisions with algorithms and policy tuned to the requirements of GPU clients.

Once the virtualization requirements have been met, it becomes possible to allow a client driver to directly access the GPU hardware. The rules are similar to those for virtualizing other kernel functions, that is, the hosted driver should not be able to detect that it is running on a VMM and it should not be able to circumvent any of the protection mechanisms put in place by the VMM. For the purposes of this discussion, it is assumed that the GPU VMM is embedded in the kernel VMM and for all practical purposes operates as a driver in the kernel VMM. The graphics VMM may include a device-independent portion and a device-dependent portion (the latter provided by the graphics hardware manufacturer).

Figure 3B:
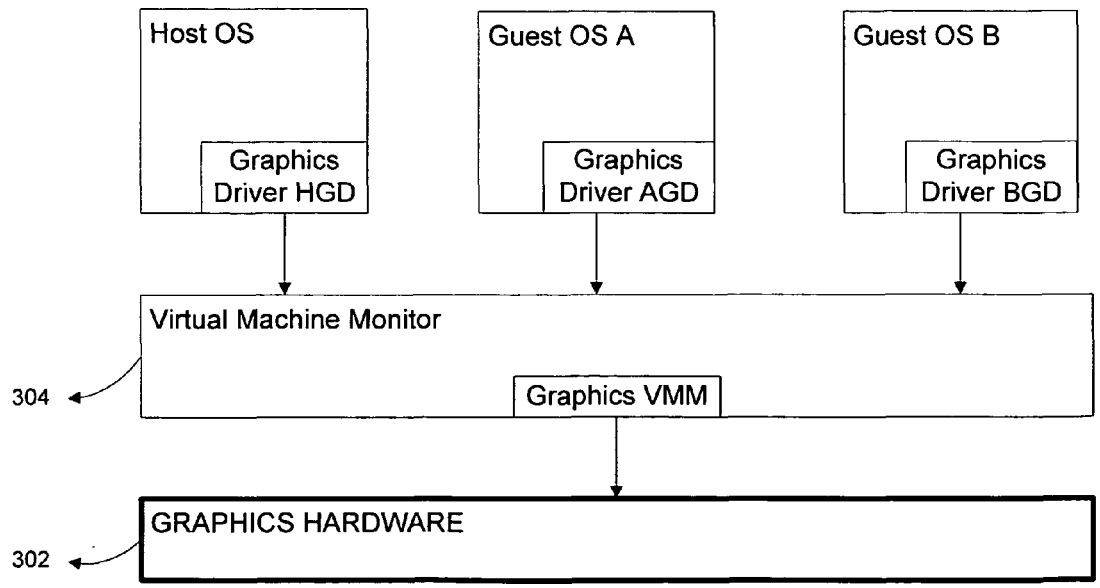
FIG. 3B illustrates another exemplary non-limiting architecture provided to virtualize the graphics pipeline in accordance with the invention.

FIG. 3B illustrates another exemplary non-limiting architecture provided to virtualize the graphics pipeline in accordance with the invention. A virtual machine monitor 304 include a component graphics VMM that handles graphics functionality and management in accordance with the invention. Any of a host OS with host graphics driver HGF, Guest OS A with graphics driver AGD and Guest OS B with graphics driver BGD can interact with the graphics VMM via VMM 304.

Since one of the motivations for using a VMM is efficiency, it makes sense to directly implement a type II graphics VMM with hardware support. Providing an advanced display driver model (DDM) adds hardware support for access controlled virtual address spaces, preemption, and privileged operations. One litmus test for efficient VMM support is running an existing advanced DDM driver on top of the graphics VMM with no changes to the driver. This means that graphics subsystem kernel operations that initialize the card, set up page tables, program display controllers, set up the PCI aperture, manipulate inputs interpreted as physical addresses, etc.

should generate traps to the VMM for efficient interpretation. Interrupts should be interceptable by the VMM and forwarded to the appropriate (Guest) driver. High frequency non-privileged operations, such as rendering operations, should be executable by the graphics hardware without intervention by the VMM.

The advanced driver model hardware supports multiple execution contexts, each with a separate virtual address space and input queue (ring buffer) for managing incoming DMA buffers of command streams. Local and system physical memory resources are mapped into the virtual address space of a context by initializing page table entries to point to the physical addresses. Completion of command stream operations is signaled using memory writes (fences) and interrupts.

One method for managing memory protection is to partition the local graphics memory physical address space and allocate a fixed contiguous partition to each virtual machine (Guest OS). Memory outside the allocation is not visible to the virtual machine. This mechanism could be implemented using a simple level of indirection through base and limit registers programmed by the graphics VMM. This may require controlling the contents of the PCI bus configuration registers visible to the driver (reads trapped by the VMM). In this memory management scheme each Guest sees a fixed memory allocation for the lifetime of the Guest. This eliminates the need for the VMM to trap page table operations (which may be frequent) since the window of physical address space visible to the hardware is carefully controlled by the VMM. This is a reasonable first approach to implementing the virtualized memory support since it leaves the VMM out of detailed memory management while arguably providing less efficient utilization of memory resources.

It is conceivable longer term to have the VMM more involved in the detailed memory management operations. This part becomes more complicated since the operations used by the driver to program page table entries are to be trapped by the VMM. Depending on the performance goals for paging, the hardware design may need to be more carefully designed to improve the efficiency of detecting and emulating these operations. For example, it may beneficial to design the page mapping operation (commands) so that multiple mappings can be specified as a group and they can be easily recognized and decoded as a group in the graphics VMM. This minimizes the number of traps through the VMM. Also, the VMM may use (trusted) services in a Guest partition to support paging operations to backing store (another level of backing store beyond what a Guest DDM driver implements). While this scheme is more complicated, it allows each Guest to make use of all of the hardware memory resources.

The approach described in connection with these embodiments of the invention implies the use of software-virtualized page tables. An alternative approach to software-virtualized page tables is to add another set of privileged page tables, i.e., another level of indirection, in the graphics hardware for use directly by the VMM. This is a generalization of the base and limit register approach described for fixed-partitions, allowing the VMM to control the graphic hardware's view of physical resource(s) at page-level granularity.

The memory management discussion, so far, has focused on managing the mapping of local graphics memory to graphics contexts. There are similar requirements in mapping system memory pages into the hardware since these also use physical memory addresses. The manner in which the processor VMM manages physical memory enters into the picture. Generally, devices that use physical addresses are carefully managed to retain full control over their mappings. A simple fixed-partition scheme proposed for video memory could be extended to work for system memory again by adding graphics hardware controls to limit the window of system memory available. However, it is inapplicable if the processor VMM allocates non-contiguous physical memory when servicing allocation operations for Guests. This means that the more complicated scheme for detailed memory management must be implemented for system memory resources (this suggests doing the local graphics memory solution at the same time). There are likely some additional assumptions made by the processor VMM regarding managing physical memory and potential interactions with the graphics VMM that need to be carefully examined.

To allow interrupts to be processed more efficiently, interrupt types could be partitioned into those that need to be processed by the VMM and those that do not. The latter category could include command completions, etc. and these can be processed directly by the Guest driver.

The other major category of management is scheduling of processing resources. The advanced driver model supports preemption of contexts, so the simplest management model has the VMM allocate time slices to partitions, preempting the current running graphics context from the current running partition. The current advanced driver model uses a double buffered run list when specifying a new list of contexts to run. There is an assumption that there will be no more than one outstanding run list. The virtualized scheduling model will require some modifications to make it easier for the VMM to switch partitions at run list boundaries and to further ensure that when a transition is made to a new partition that the context state is saved in the old partition and restored from the new partition (e.g., the appropriate partition's memory resources are mapped at the right times during context save and restore). Again there will be assumptions and interactions with the processor VMM's scheduler that are to be considered.

A more elaborate scheduling scheme can be implemented where the graphics VMM is more cognizant of the workload and priorities of different contexts. This information can be made available to the processor VMM to make more intelligent scheduling decisions. There are some interesting design issues regarding whether graphics VMM can be executing a context from a different partition than the processor VMM is executing. It is possible and it may be necessary to allow some overlap in processing during transitions between partitions to maximize hardware utilization. However, it does require more careful consideration of how the resources are managed and mapped during transitions.

With respect to virtualizing presentation and interaction, in a first embodiment, once the graphics hardware is virtualized, then each Guest creates its own desktop and renders the windows from Guest applications to that desktop. This Guest desktop is stored in local graphics memory and under a normal environment is scanned out to the display device (CRT or flat panel). In the virtualized environment, the contents of multiple Guess desktops are collected together and displayed on a single display. There are several approaches to creating this display including the provision of multiple virtual desktops (single desktop at a time), the provision of a desktop in its own window or a single unified desktop.

In the first embodiment, a single Guest desktop is chosen as the "current" desktop and is displayed. Using some UI control, the user can select between different Guests, but only one is displayed at a time. This approach is the simplest since the individual Guest desktop images can simply be displayed. In effect, the UI control determines which Guest is allowed to set the display controller scan-out registers.

Figure 4A:
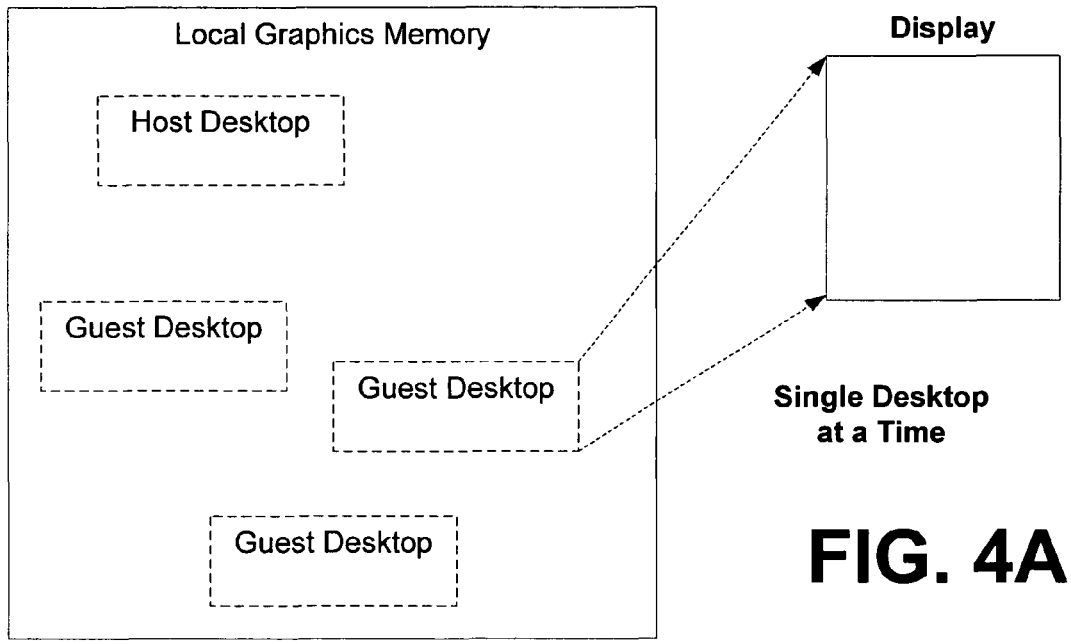
FIG. 4A illustrates an embodiment for displaying a "single desktop at a time" in accordance with the invention.

FIG. 4A illustrates the embodiment displaying a "single desktop at a time." One can see that each virtual machine receives its own desktop space in local graphics memory wherein each space is independent of the others, whereby only the 'active' desktop selected by the user is scanned out for display. Guests are thus able to rasterize their respective work items and leave them in memory somewhere and a presentation engine is able to control which memory (containing the rasterized bits) is displayed, which might implicate additional rasterization processing to resize or move the contents.

By definition, this first embodiment does not allow multiple desktops to be visible concurrently (though in a multimon configuration, different display controllers could display desktops from different Guests rather than all from the same Guest). An alternate approach is the second embodiment in which individual desktops are displayed in separate container windows on the Host desktop. This uses a service to be run on the Host that has access to the contents of each Guest desktop. The service performs a compositing operation to construct the Host desktop using the Guest desktops as input. A proxy window is used for each Guest desktop, controlling the size and location of the desktop. The contents of a Guest desktop can be extracted directly from the video memory contents by intercepting the changes to the display controller settings for that desktop (using them to determine the memory address, dimensions, and other parameters). The composite Host desktop is constructed in much the same way as a typical desktop is constructed using the Desktop Composition Engine (DCE)—also using hardware graphics acceleration. This second embodiment can be combined with the first one to support a mode with a single direct view of a Guest desktop or a mode with a composite view of multiple desktops in separate windows.

Figure 4B:
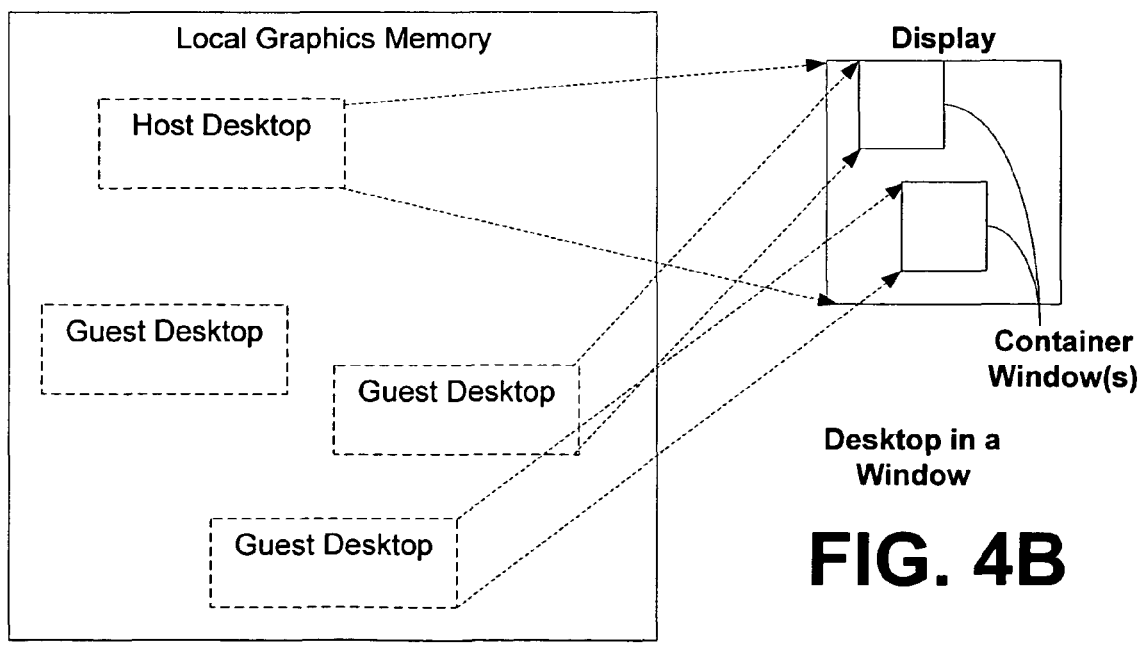
FIG. 4B illustrates an alternative "desktop in a window" embodiment, whereby all of the desktops can be simultaneously displayed in accordance with the invention.

FIG. 4B illustrates an alternative "desktop in a window" embodiment, whereby all of the desktops can be simultaneously displayed by a presentation engine taking into account occlusion. For instance, a host desktop could by default be the background desktop window on display, and Guest desktops, each displayed within their own container window, receive a separate window on display on top of the background desktop window.

This second embodiment starts to introduce some complications with input coordination when synchronizing the position and size of windows of the Guest desktop. As windows are manipulated in the Host container window for the Guest desktop, those interactions are trapped and sent to the Guest for processing. The Guest, e.g., its window manager, updates the Guest desktop and the new window positions are reflected in the Host desktop as it is rebuilt. This type of input coordination has already been addressed in other virtualization products that implement "Desktop-in-a-window" and should be unaffected by virtualizing the graphics hardware.

The second embodiment is a significant improvement, but it would still be desirable to intermix the windows from multiple Guest desktops, that is, hide the fact that there are Guest desktops. This problem amounts to locating the individual Window contents in each Guest desktop, but is more difficult than locating the desktop contents since individual Window information is not easily intercepted from the stream of data sent to the graphics hardware. However, if the rule regarding modifying the Guest operating system is purposefully violated, it is possible to add some hooks to assist in identifying the pixels (memory locations) for individual windows. There are a couple of different approaches that can be taken here.

One approach is to keep the windows in the Guest desktop tiled (no-overlapping) so that the entire contents are always available while maintaining information about the size and location of each window in the Guest desktop for use by the Host window manager/composition engine. This approach involves maintaining two separate sets of window information: the virtual information (in the Host desktop) and the physical location in the Guest desktop. It also complicates the input coordination since operations that manipulate the virtual window may or may not affect the physical window (for example, if the virtual window is occluded it may be beneficial to reclaim the real estate in the Guest desktop). Interactions within the virtual window are translated to interactions appropriate for the physical window (this could be as simple as an offset to the input coordinates).

An alternate approach is to redirect Guest desktop windows to memory that is more readily managed. This is analogous to the redirection done for the Graphics Device Interface (GDI) where a separate "back buffer" is maintained for each Window. The contents of these back buffers are made available to the Host window manager/composition engine. A similar mapping between virtual input coordinates and physical input coordinates is then performed when the user interacts with the contents of a virtual window.

With some foresight and planning, it is possible to shape future operating systems to better facilitate such interceptions when these operating systems are run as Guests. The disposition of the shell in each Guest desktop (if and when they cease to exist from the user's perspective), shell extension handling, Start menu options, application shortcuts, clip board, etc. merged into a unified desktop view. These are solvable problems, but involve understanding more detail about the corresponding implementations in each of the Guests and likely (statically) extracting and merging that information together to produce a unified view. Similar questions arise for supporting unified accessibility.

Similar issues may exist in providing a seamless view of other parts of a multi-Guest system, for example, storage, installed applications, networking, etc. An interim strategy of exposing the multiple Guests as windowed-desktops with independent fingerprints would allows focus on the task of building a robust virtualization infrastructure. In parallel, it is possible to address some additional features such as trusted processing and content protection for digital rights management.

As the basis for secure (trusted) graphics processing, the above-described virtualized graphics systems dovetail with other models for secure processing using virtual machines. The characteristics of the virtualized graphics environment readily allow a mixture of trusted and untrusted processing to occur on the same system in a reliable fashion at full performance. Such a model requires the graphics VMM to robustly authenticate and bootstrap the graphics device. It, of course, relies on other trusted components to securely bootstrap the graphics VMM. Since the virtualization environment robustly protects multiple Guests and the Host partition from each other, it is possible to build a trusted partition that can do trusted graphics processing. If the window manager and composition engine run as services in a trusted partition, then they can intermix trusted and untrusted application data in a reliable fashion using the presentation methods described previously.

Figure 4C:
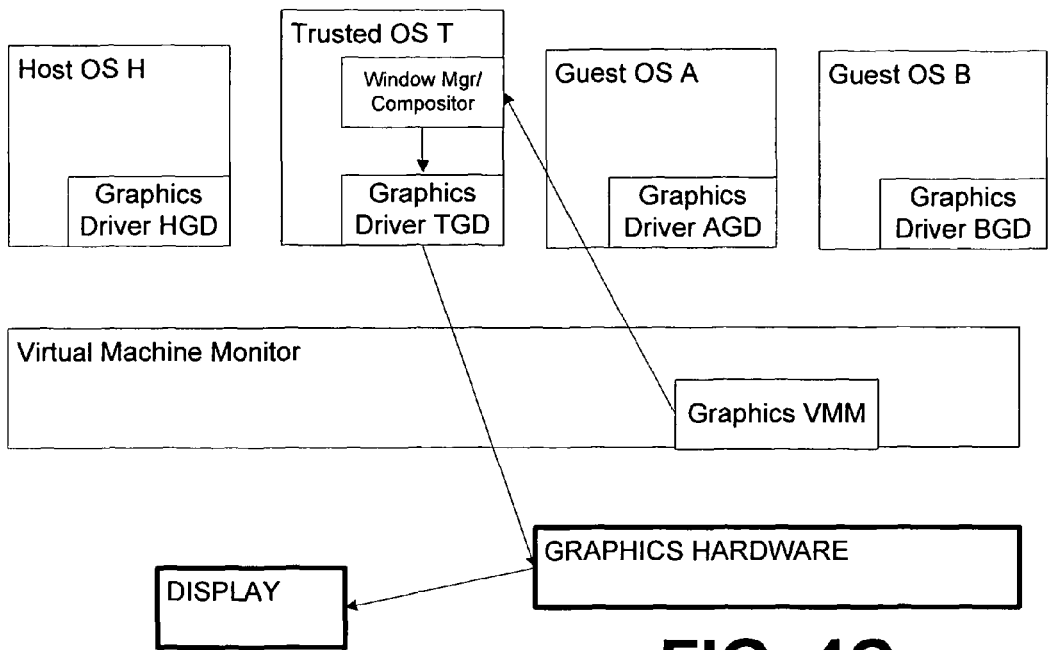
FIG. 4C illustrates an exemplary architecture for intermixing trusted and untrusted application data according to the invention.

FIG. 4C illustrates an exemplary architecture for intermixing trusted and untrusted application data according to the invention. As described, similar to Host OS H with graphics driver HGD, a Trusted OS T is provided as a trusted partition with graphics driver TGD. Trusted OS T includes a window manager, or window compositor, component that takes input from the graphics VMM code regarding any restrictions on storage and rendering of trusted data versus untrusted data, prior to rendering by the graphics pipeline.

The trusted service does require access to the separate Guest desktop display data, but this information is not interpreted as control data by the composition service. It is used as rendering input, so there is no risk of attack from the contents of the shared data. If the graphics hardware is virtualized correctly, there is no risk of code in one partition attacking another. Guest drivers cannot take control of the hardware nor interfere with other Guests. Application code running inside the graphics hardware cannot interfere with other applications in the same Guest partition, let alone with other Guest partitions.

The virtualization support of the invention does not obviate the needs for hardware authentication, robust control over display outputs or other requirements to ensure a single trusted partition can reliably deliver display data to the display device, but it does allow multiple partitions to robustly share the graphics hardware with little performance impact.

With respect to the basis for content protection during processing and display in accordance with the invention, enforcement of digital rights for full-motion video data is currently achieved using a "Protected Video Path" to protect the content. The protected video path integrates several of the following methods to provide secure transport and processing of video data from a source device to the display device:

(1) The kernel environment is hardened to disallow kernel-debuggers, etc. and only trusted components are allowed to operate in kernel mode ("ring 0") while protected content is playing;

(2) User-mode processes handling protected content are further hardened from outside attack (protected environment). Video data staged in (or displayed from) system or graphics memory cannot be accessed from other processes;

(3) Video data sent over user-accessible busses are encrypted;

(4) The graphics driver must be certified to play protected content and it in turn validates that the graphics hardware is a valid sync for protected content; and (5) Display output protection is supported by the graphics hardware (Macrovision, CGSM-A, HDCP) and can be robustly manipulated by the media playback subsystem.

Mechanisms (1) and (2) can be replaced with a more general secure computing base in accordance with the invention. This secure computing base should further prevent circumvention through virtualization technology by making it impossible to subvert a secure bootstrapping process. Mechanisms (3) to (5) are still required to continue providing secure processing and transport of video data as it moves from system memory through the graphics hardware and to display. The graphics hardware virtualization methods of the invention do not replace any of the specific graphics path-related content protection methods; instead, they serve as a foundation for building trusted graphics services. These trusted services can be expanded to include the protected media processing components (Media Interoperability Gateway, or MIG for short), and running them in "safe" trusted partition rather than a hostile Guest partition. The existing protected video infrastructure has already separated the protected processing (rights negotiation, policy, decode, decryption) from the unprotected processing (playback application GUI, etc.). This separation remains intact in the virtualized environment, with the protected components executing in a trusted partition (a different [better] protected environment) and the unprotected components remain in an untrusted Guest partition.

Figure 4D:
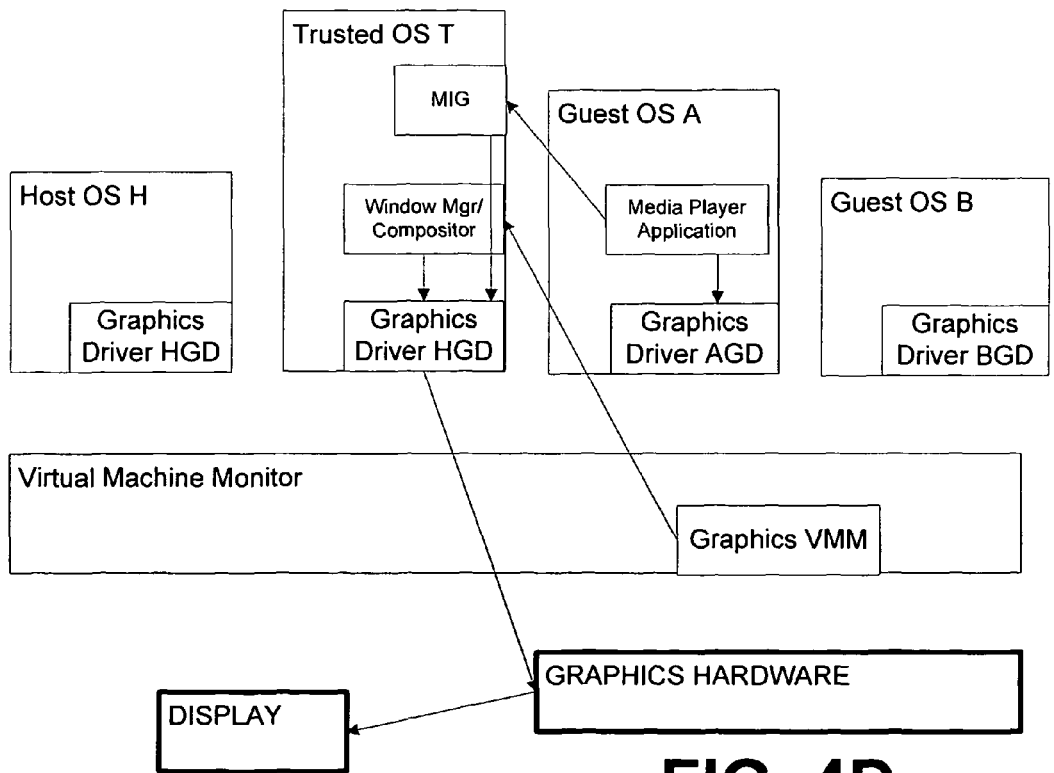
FIG. 4D illustrates an extension of a trusted partition to include a media interoperability gateway, as a separate layer of protection for content.

FIG. 4D thus illustrates the extension of the notion of the trusted partition T developed in connection with FIG. 4C to include a media interoperability gateway MIG, as a separate layer of protection for content being rendered by a media player application executing on Guest OS A.

In the same way that the Virtual PC product can run a large number of OSes, the virtualized graphics environment of the invention is capable of supporting the drivers/driver models for a pre-defined number of operating systems or versions.

The success of each operating system is measured by the breadth of applications it can run and the efficiency of those applications. By ruthlessly avoiding the urge to modify the Guest operating systems, it should be possible to run any application under the virtualized operating system that runs under the operating system executing natively. Places where there may be differences lie in how the resources are partitioned. For example, if only a subset of the resources (part of the local graphics memory) are made available to a partition, then the application may not operate as well. In future operating systems, this may be less of an issue as the "first order" virtualization—virtualization of the resources for sharing between multiple applications becomes the norm.

The inspiration for moving towards fully virtualized graphics hardware is for software companies to be freed from legacy code issues while still providing a practical path for continued application compatibility. As a side effect, the invention also provides an excellent environment for trusted graphics processing and content protection.

This second measure of success means that applications moving forward must stop using the legacy code and move forward as well. For large application code bases, this may be exceedingly difficult. For example, it may not be possible to leave GDI software behind as legacy code if, for example, a legacy application code base that evolves with OS versions, such as Microsoft's Office code base, is inextricably dependent on it. In such cases, there might perhaps be hybrid models that can be explored. For example, the Guest operating systems can be viewed as general service providers. Again using GDI as an example, a legacy operating system could be thought of as providing a GDI rendering service. The application uses a remoting-like mechanism that uses the service. The goal in such a case is not necessarily to run the application without any code changes, but rather to make a minimum of changes that would allow the application to continue to use the legacy GDI code as a cross-partition service while buying time to transition completely off the API.

Figure 4E:
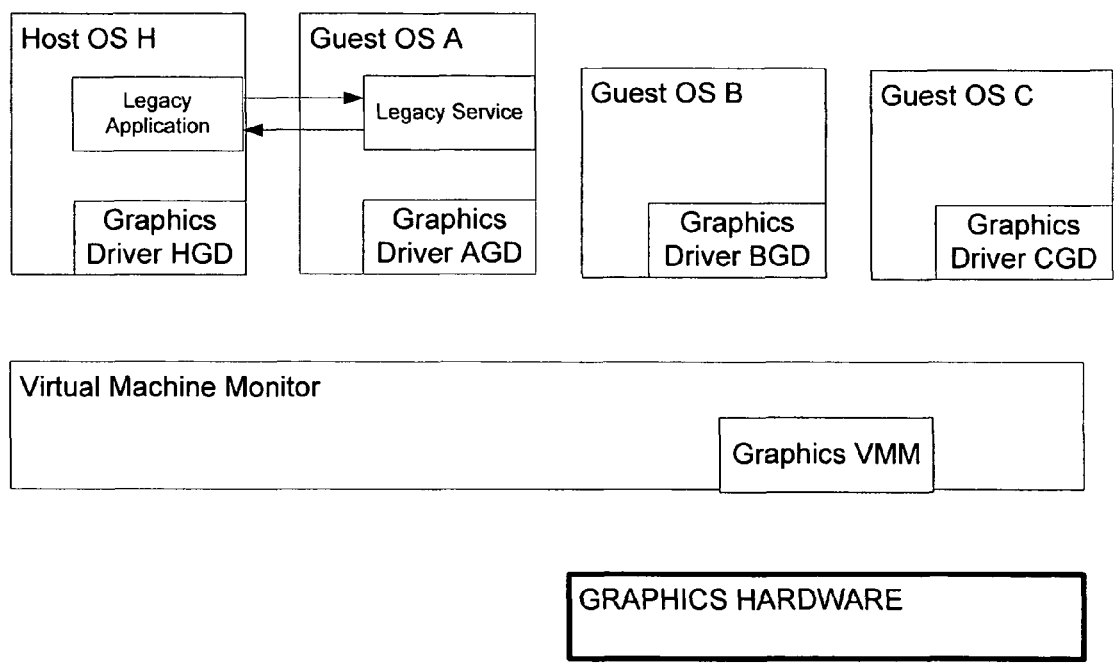
FIG. 4E illustrates exemplary interaction wherein a Guest OS legacy application executing on a host OS interacts with a legacy services component of the Guest OS to emulate the legacy behavior.

FIG. 4E illustrates exemplary interaction wherein a Guest OS A legacy application executing on host OS H interacts with a legacy services component of Guest OS A to nonetheless emulate the legacy behavior from the perspective of host OS H.

Figure 5:
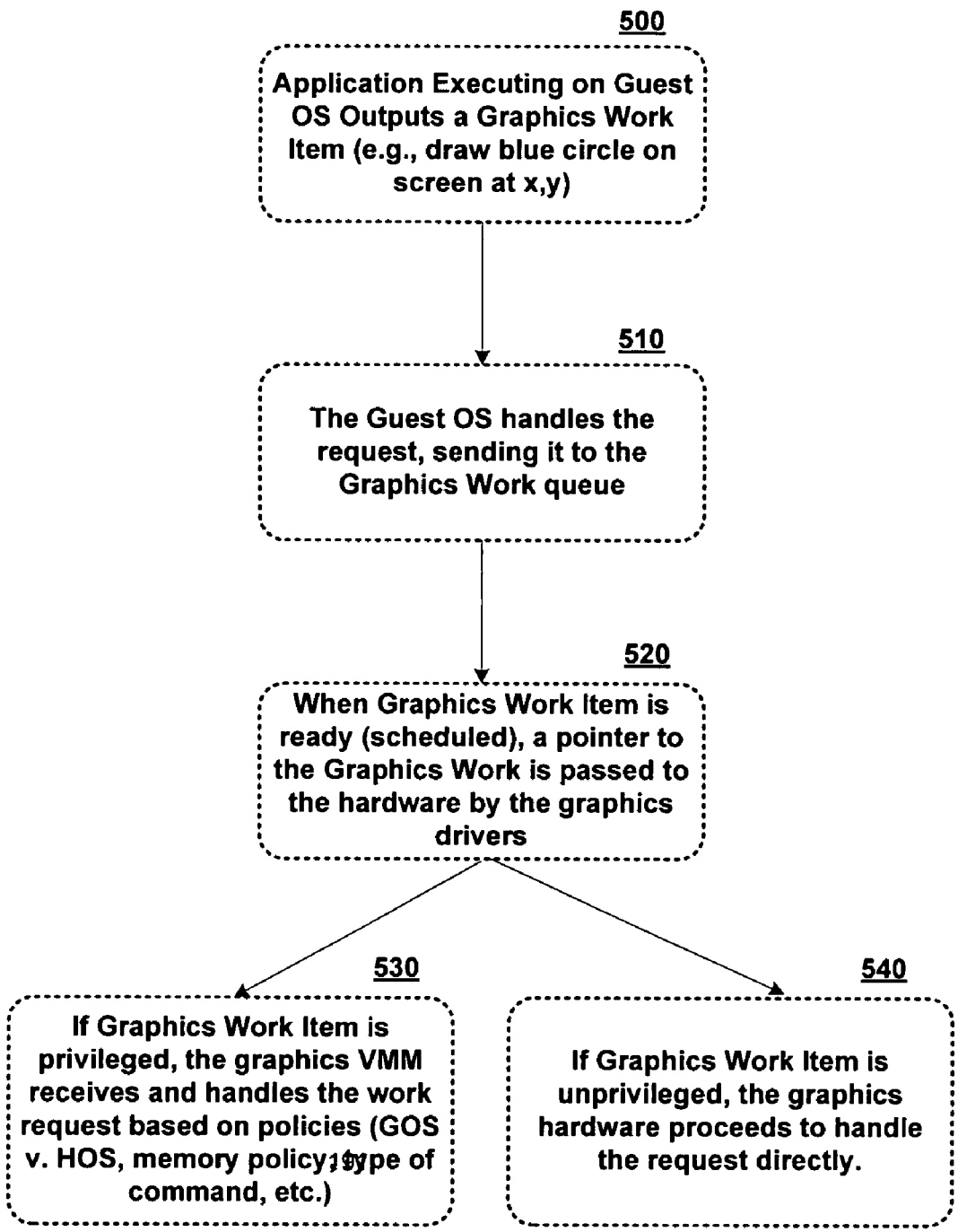
FIG. 5 is a flow diagram representing an exemplary non-limiting sequence of processing of graphics data in accordance with one or more embodiments of the virtualized graphics architectures provided in accordance with the invention.

FIG. 5 illustrates an exemplary sequence wherein an application executing on a Guest OS, in accordance with any of the virtualized architectures shown or described herein, issues a command implicating graphics subsystem resources. At 500, an application executing on a Guest OS outputs a graphics work item (e.g., draw blue circle on screen at coordinate "x,y"). At 510, the Guest OS handles the request, sending it to the graphics work queue and associated scheduler. At 520, when the graphics work item is ready (scheduled), a pointer to the graphics work item data is passed to the hardware by the graphics drivers. At 530, if the graphics work item is a privileged operation, then the graphics VMM receives and handles the work request based on policies (Guest OS v. Host OS, memory policy, type of command, etc.). If graphics work item is unprivileged, then instead at 540, the graphics hardware proceeds to handle the request directly.

The invention thus virtualizes processor hardware to the graphics accelerator with the intent of providing the benefits of high-performance rendering to multiple Guest operating systems running in a virtualized environment. Such an environment can be used to efficiently solve several problems: (A) eliminating legacy code in new operating system development while maintaining application compatibility by executing the legacy application in the legacy operating system in a virtual machine environment; (B) providing infrastructure safely mixing trusted and untrusted processing in the same virtualized environment; and (C) leveraging the trusted environment to provide content protection for digital rights management.

Exemplary Networked and Distributed Environments

One of ordinary skill in the art can appreciate that the invention can be implemented in connection with any computer or other client or server device, which can be deployed as part of a computer network, or in a distributed computing environment. In this regard, the present invention pertains to any computer system or environment having any number of memory or storage units, and any number of applications and processes occurring across any number of storage units or volumes, which may be used in connection with virtualizing the graphics pipeline in accordance with the present invention. The present invention may apply to an environment with server computers and client computers deployed in a network environment or distributed computing environment, having remote or local storage. The present invention may also be applied to standalone computing devices, having programming language functionality, interpretation and execution capabilities for generating, receiving and transmitting information in connection with remote or local services. In a gaming environment, a graphics pipeline is particularly relevant to those computing devices operating in a network or distributed computing environment, and thus virtualization of the graphics pipeline in accordance with the present invention can be applied with great efficacy in those environments.

Distributed computing provides sharing of computer resources and services by exchange between computing devices and systems. These resources and services include the exchange of information, cache storage and disk storage for files. Distributed computing takes advantage of network connectivity, allowing clients to leverage their collective power to benefit the entire enterprise. In this regard, a variety of devices may have applications, objects or resources that may implicate the graphics processes of the invention.

Figure 6A:
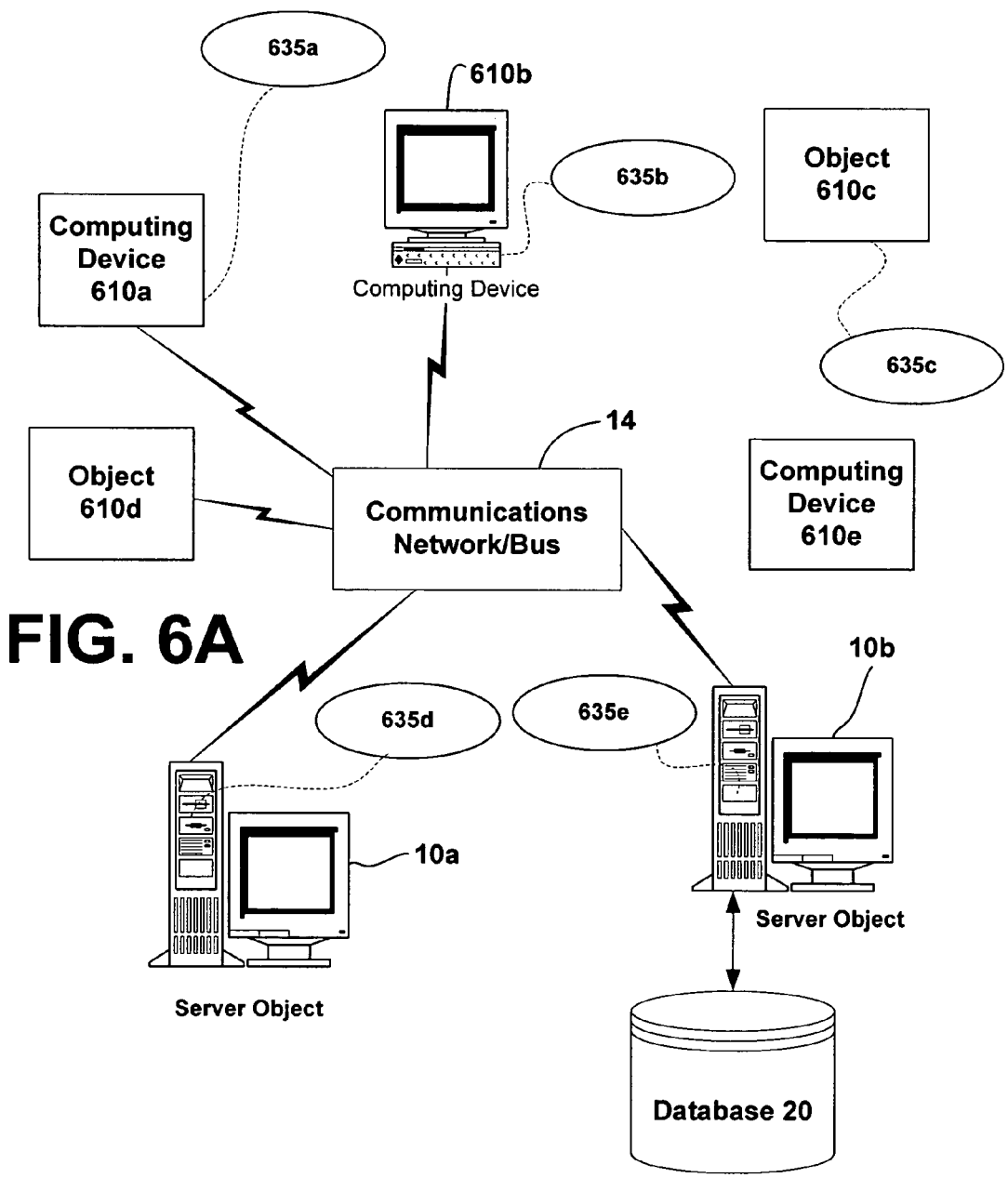
FIG. 6A is a block diagram representing an exemplary network environment having a variety of computing devices in which the present invention may be implemented.

FIG. 6A provides a schematic diagram of an exemplary networked or distributed computing environment. The distributed computing environment comprises computing objects 10a, 10b, etc. and computing objects or devices 610a, 610b, 610c, etc. These objects may comprise programs, methods, data stores, programmable logic, etc. The objects may comprise portions of the same or different devices such as PDAs, audio/video devices, MP3 players, personal computers, etc. Each object can communicate with another object by way of the communications network 14. This network may itself comprise other computing objects and computing devices that provide services to the system of FIG. 6A, and may itself represent multiple interconnected networks. In accordance with an aspect of the invention, each object 10a, 10b, etc. or 610a, 610b, 610c, etc. may contain an application that might make use of an API, or other object, software, firmware and/or hardware, to request use of the graphics virtualization processes of the invention.

It can also be appreciated that an object, such as 610c, may be hosted on another computing device 10a, 10b, etc. or 610a, 610b, etc. Thus, although the physical environment depicted may show the connected devices as computers, such illustration is merely exemplary and the physical environment may alternatively be depicted or described comprising various digital devices such as PDAs, televisions, MP3 players, etc., software objects such as interfaces, COM objects and the like.

There are a variety of systems, components, and network configurations that support distributed computing environments. For example, computing systems may be connected together by wired or wireless systems, by local networks or widely distributed networks. Currently, many of the networks are coupled to the Internet, which provides an infrastructure for widely distributed computing and encompasses many different networks. Any of the infrastructures may be used for exemplary communications made incident to the graphics hardware virtualization processes of the present invention.

In home networking environments, there are at least four disparate network transport media that may each support a unique protocol, such as Power line, data (both wireless and wired), voice (e.g., telephone) and entertainment media. Most home control devices such as light switches and appliances may use power lines for connectivity. Data Services may enter the home as broadband (e.g., either DSL or Cable modem) and are accessible within the home using either wireless (e.g., HomeRF or 802.11B) or wired (e.g., Home PNA, Cat 5, Ethernet, even power line) connectivity. Voice traffic may enter the home either as wired (e.g., Cat 3) or wireless (e.g., cell phones) and may be distributed within the home using Cat 3 wiring. Entertainment media, or other graphical data, may enter the home either through satellite or cable and is typically distributed in the home using coaxial cable. IEEE 1394 and DVI are also digital interconnects for clusters of media devices. All of these network environments and others that may emerge as protocol standards may be interconnected to form a network, such as an intranet, that may be connected to the outside world by way of the Internet. In short, a variety of disparate sources exist for the storage and transmission of data, and consequently, moving forward, computing devices will require ways of sharing data, such as data accessed or utilized incident to program objects, which make use of the virtualized graphics services in accordance with the present invention.

The Internet commonly refers to the collection of networks and gateways that utilize the TCP/IP suite of protocols, which are well-known in the art of computer networking. TCP/IP is an acronym for "Transmission Control Protocol/Internet Protocol." The Internet can be described as a system of geographically distributed remote computer networks interconnected by computers executing networking protocols that allow users to interact and share information over the network (s). Because of such wide-spread information sharing, remote networks such as the Internet have thus far generally evolved into an open system for which developers can design software applications for performing specialized operations or services, essentially without restriction.

Thus, the network infrastructure enables a host of network topologies such as client/server, peer-to-peer, or hybrid architectures. The "client" is a member of a class or group that uses the services of another class or group to which it is not related. Thus, in computing, a client is a process, i.e., roughly a set of instructions or tasks, that requests a service provided by another program. The client process utilizes the requested service without having to "know" any working details about the other program or the service itself. In a client/server architecture, particularly a networked system, a client is usually a computer that accesses shared network resources provided by another computer, e.g., a server. In the example of FIG. 6A, computers 610a, 610b, etc. can be thought of as clients and computers 10a, 10b, etc. can be thought of as the server where server 10a, 10b, etc. maintains the data that is then replicated in the client computers 610a, 610b, etc., although any computer can be considered a client, a server, or both, depending on the circumstances. Any of these computing devices may be processing data or requesting services or tasks that may implicate an implementation of the virtualized graphics architectures of the invention.

A server is typically a remote computer system accessible over a remote or local network, such as the Internet. The client process may be active in a first computer system, and the server process may be active in a second computer system, communicating with one another over a communications medium, thus providing distributed functionality and allowing multiple clients to take advantage of the information-gathering capabilities of the server. Any software objects utilized pursuant to making use of the virtualized architecture(s) of the invention may be distributed across multiple computing devices or objects.

Client(s) and server(s) communicate with one another utilizing the functionality provided by protocol layer(s). For example, HyperText Transfer Protocol (HTTP) is a common protocol that is used in conjunction with the World Wide Web (WWW), or "the Web." Typically, a computer network address such as an Internet Protocol (IP) address or other reference such as a Universal Resource Locator (URL) can be used to identify the server or client computers to each other. The network address can be referred to as a URL address. Communication can be provided over a communications medium, e.g., client(s) and server(s) may be coupled to one another via TCP/IP connection(s) for high-capacity communication.

Thus, FIG. 6A illustrates an exemplary networked or distributed environment, with a server in communication with client computers via a network/bus, in which the present invention may be employed. In more detail, a number of servers 10a, 10b, etc., are interconnected via a communications network/bus 14, which may be a LAN, WAN, intranet, the Internet, etc., with a number of client or remote computing devices 610a, 610b, 610c, 610d, 610e, etc., such as a portable computer, handheld computer, thin client, networked appliance, or other device, such as a VCR, TV, oven, light, heater and the like in accordance with the present invention. It is thus contemplated that the present invention may apply to any computing device in connection with which it is desirable to implement guest graphics interfaces and operating systems in accordance with the invention.

In a network environment in which the communications network/bus 14 is the Internet, for example, the servers 10a, 10b, etc. can be Web servers with which the clients 610a, 610b, 610c, 610d, 610e, etc. communicate via any of a number of known protocols such as HTTP. Servers 10a, 10b, etc. may also serve as clients 610a, 610b, 610c, 610d, 610e, etc., as may be characteristic of a distributed computing environment.

Communications may be wired or wireless, where appropriate. Client devices 610a, 610b, 610c, 610d, 610e, etc. may or may not communicate via communications network/bus 14, and may have independent communications associated therewith. For example, in the case of a TV or VCR, there may or may not be a networked aspect to the control thereof. Each client computer 610a, 610b, 610c, 610d, 610e, etc. and server computer 10a, 10b, etc. may be equipped with various application program modules or objects 635 and with connections or access to various types of storage elements or objects, across which files or data streams may be stored or to which portion(s) of files or data streams may be downloaded, transmitted or migrated. Any one or more of computers 10a, 10b, 610a, 610b, etc. may be responsible for the maintenance and updating of a database 20 or other storage element, such as a database or memory 20 for storing data processed according to the invention. Thus, the present invention can be utilized in a computer network environment having client computers 610a, 610b, etc. that can access and interact with a computer network/bus 14 and server computers 10a, 10b, etc. that may interact with client computers 610a, 610b, etc. and other like devices, and databases 20.

Exemplary Computing Device

Figure 6B:
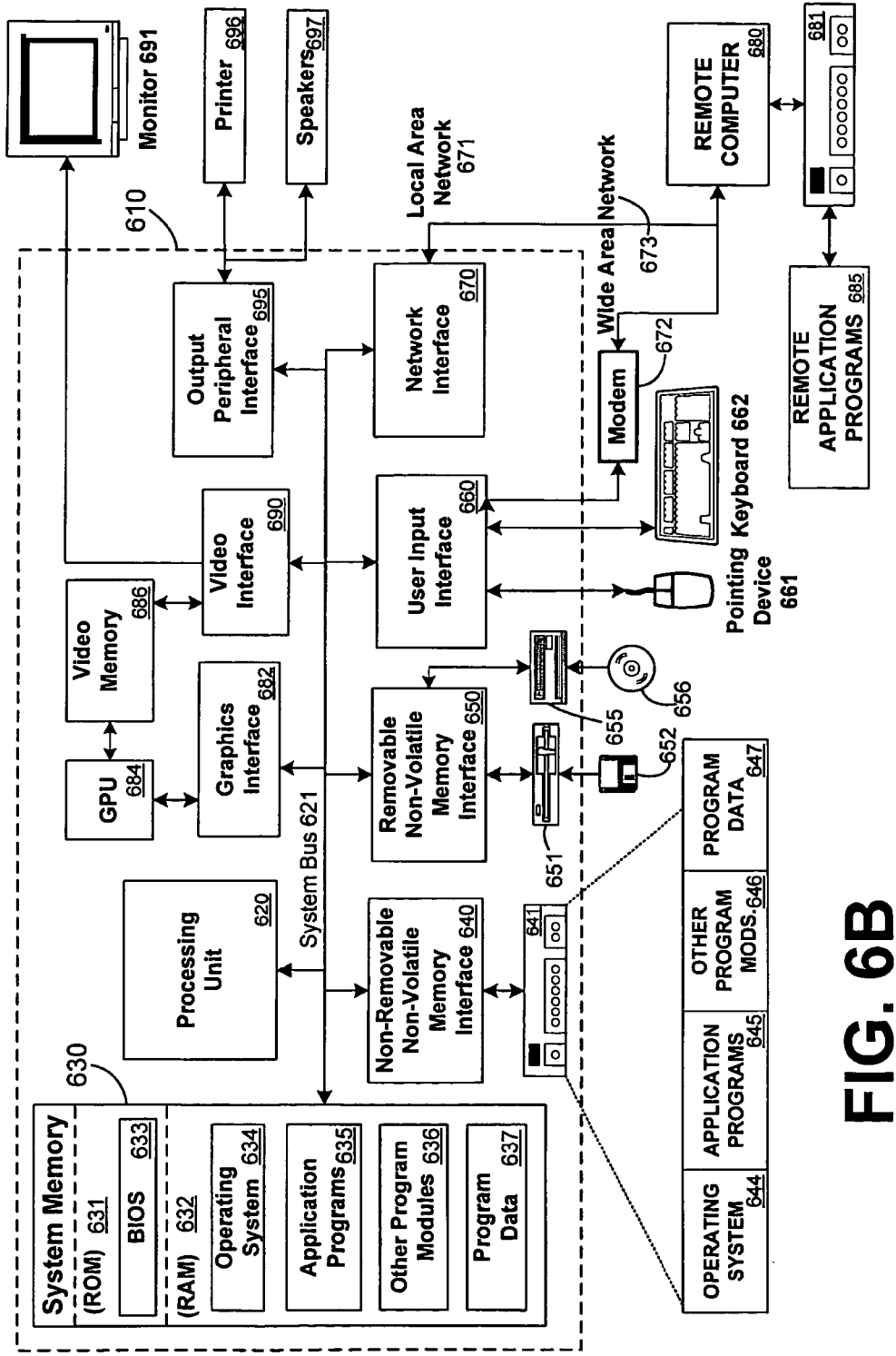
FIG. 6B is a block diagram representing an exemplary non-limiting computing device in which the present invention may be implemented.

FIG. 6B and the following discussion are intended to provide a brief general description of a suitable computing environment in connection with which the invention may be implemented. It should be understood, however, that handheld, portable and other computing devices and computing objects of all kinds are contemplated for use in connection with the present invention, i.e., anywhere where that a GPU exists in a computing environment. While a general purpose computer is described below, this is but one example, and the present invention may be implemented with a thin client having network/bus interoperability and interaction. Thus, the present invention may be implemented in an environment of networked hosted services in which very little or minimal client resources are implicated, e.g., a networked environment in which the client device serves merely as an interface to the network/bus, such as an object placed in an appliance. In essence, anywhere that data may be stored or from which data may be retrieved or transmitted to another computer is a desirable, or suitable, environment for operation of the graphics virtualization techniques in accordance with the invention.

Although not required, the invention can be implemented in whole or in part via an operating system, for use by a developer of services for a device or object, and/or included within application software that operates in connection with the virtualized graphics pipeline(s) of the invention. Software may be described in the general context of computer-executable instructions, such as program modules, being executed by one or more computers, such as client workstations, servers or other devices. Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that the invention may be practiced with other computer system configurations and protocols. Other well known computing systems, environments, and/or configurations that may be suitable for use with the invention include, but are not limited to, personal computers (PCs), automated teller machines, server computers, hand-held or laptop devices, multi-processor systems, microprocessor-based systems, programmable consumer electronics, network PCs, appliances, lights, environmental control elements, minicomputers, mainframe computers and the like. The invention may also be practiced in distributed computing environments where tasks are performed by remote processing devices that are linked through a communications network/bus or other data transmission medium. In a distributed computing environment, program modules may be located in both local and remote computer storage media including memory storage devices, and client nodes may in turn behave as server nodes.

FIG. 6B thus illustrates an example of a suitable computing system environment 600 in which the invention may be implemented, although as made clear above, the computing system environment 600 is only one example of a suitable computing environment and is not intended to suggest any limitation as to the scope of use or functionality of the invention. Neither should the computing environment 600 be interpreted as having any dependency or requirement relating to any one or combination of components illustrated in the exemplary operating environment 600.

With reference to FIG. 6B, an exemplary system for implementing the invention includes a general purpose computing device in the form of a computer 610. Components of computer 610 may include, but are not limited to, a processing unit 620, a system memory 630, and a system bus 621 that couples various system components including the system memory to the processing unit 620. The system bus 621 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus (also known as Mezzanine bus), and PCI Express (PCIe).

Computer 610 typically includes a variety of computer readable media. Computer readable media can be any available media that can be accessed by computer 610 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 610. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 630 includes computer storage media in the form of volatile and/or nonvolatile memory such as read only memory (ROM) 631 and random access memory (RAM) 632. A basic input/output system 633 (BIOS), containing the basic routines that help to transfer information between elements within computer 610, such as during start-up, is typically stored in ROM 631. RAM 632 typically contains data and/or program modules that are immediately accessible to and/or presently being operated on by processing unit 620. By way of example, and not limitation, FIG. 6B illustrates operating system 634, application programs 635, other program modules 636, and program data 637.

The computer 610 may also include other removable/non-removable, volatile/nonvolatile computer storage media. By way of example only, FIG. 6B illustrates a hard disk drive 641 that reads from or writes to non-removable, nonvolatile magnetic media, a magnetic disk drive 651 that reads from or writes to a removable, nonvolatile magnetic disk 652, and an optical disk drive 655 that reads from or writes to a removable, nonvolatile optical disk 656, such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM and the like. The hard disk drive 641 is typically connected to the system bus 621 through a non-removable memory interface such as interface 640, and magnetic disk drive 651 and optical disk drive 655 are typically connected to the system bus 621 by a removable memory interface, such as interface 650.

The drives and their associated computer storage media discussed above and illustrated in FIG. 6B provide storage of computer readable instructions, data structures, program modules and other data for the computer 610. In FIG. 6B, for example, hard disk drive 641 is illustrated as storing operating system 644, application programs 645, other program modules 646 and program data 647. Note that these components can either be the same as or different from operating system 634, application programs 635, other program modules 636 and program data 637. Operating system 644, application programs 645, other program modules 646 and program data 647 are given different numbers here to illustrate that, at a minimum, they are different copies. A user may enter commands and information into the computer 610 through input devices such as a keyboard 662 and pointing device 661, commonly referred to as a mouse, trackball or touch pad. Other input devices (not shown) may include a microphone, joystick, game pad, satellite dish, scanner, or the like. These and other input devices are often connected to the processing unit 620 through a user input interface 660 that is coupled to the system bus 621, but may be connected by other interface and bus structures, such as a parallel port, game port or a universal serial bus (USB). These are the kinds of structures that are virtualized by the architectures of the invention. A graphics interface 682, such as one of the interfaces implemented by the Northbridge, may also be connected to the system bus 621. Northbridge is a chipset that communicates with the CPU, or host processing unit 620, and assumes responsibility for communications such as PCI, PCIe and accelerated graphics port (AGP) communications. The invention contemplates both Integrated (inside the Northbridge) and discrete (outside the Northbridge) graphics implementations. One or more graphics processing units (GPUs) 684 may communicate with graphics interface 682. In this regard, GPUs 684 generally include on-chip memory storage, such as register storage and GPUs 684 communicate with a video memory 686. GPUs 684, however, are but one example of a coprocessor and thus a variety of coprocessing devices may be included in computer 610, and may include a variety of procedural shaders, such as pixel and vertex shaders. A monitor 691 or other type of display device is also connected to the system bus 626 via an interface, such as a video interface 690, which may in turn communicate with video memory 686. In addition to monitor 691, computers may also include other peripheral output devices such as speakers 697 and printer 696, which may be connected through an output peripheral interface 695.

The computer 610 may operate in a networked or distributed environment using logical connections to one or more remote computers, such as a remote computer 680. The remote computer 680 may be a personal computer, a server, a router, a network PC, a peer device or other common network node, and typically includes many or all of the elements described above relative to the computer 610, although only a memory storage device 681 has been illustrated in FIG. 6B. The logical connections depicted in FIG. 6B include a local area network (LAN) 671 and a wide area network (WAN) 673, but may also include other networks/buses. Such networking environments are commonplace in homes, offices, enterprise-wide computer networks, intranets and the Internet.

When used in a LAN networking environment, the computer 610 is connected to the LAN 671 through a network interface or adapter 670. When used in a WAN networking environment, the computer 610 typically includes a modem 672 or other means for establishing communications over the WAN 673, such as the Internet. The modem 672, which may be internal or external, may be connected to the system bus 621 via the user input interface 660, or other appropriate mechanism. In a networked environment, program modules depicted relative to the computer 610, or portions thereof, may be stored in the remote memory storage device. By way of example, and not limitation, FIG. 6B illustrates remote application programs 685 as residing on memory device 681. It will be appreciated that the network connections shown are exemplary and other means of establishing a communications link between the computers may be used.

There are multiple ways of implementing the present invention, e.g., an appropriate API, tool kit, driver code, operating system, control, standalone or downloadable software object, etc. which enables applications and services to use the virtualized architecture(s), systems and methods of the invention. The invention contemplates the use of the invention from the standpoint of an API (or other software object), as well as from a software or hardware object that receives any of the aforementioned techniques in accordance with the invention. Thus, various implementations of the invention described herein may have aspects that are wholly in hardware, partly in hardware and partly in software, as well as in software.

As mentioned above, while exemplary embodiments of the present invention have been described in connection with various computing devices and network architectures, the underlying concepts may be applied to any computing device or system in which it is desirable to employ a GPU. For instance, the various algorithm(s) and hardware implementations of the invention may be applied to the operating system of a computing device, provided as a separate object on the device, as part of another object, as a reusable control, as a downloadable object from a server, as a "middle man" between a device or object and the network, as a distributed object, as hardware, in memory, a combination of any of the foregoing, etc. One of ordinary skill in the art will appreciate that there are numerous ways of providing object code and nomenclature that achieves the same, similar or equivalent functionality achieved by the various embodiments of the invention.

As mentioned, the various techniques described herein may be implemented in connection with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device generally includes a processor, a storage medium readable by the processor (including volatile and non-volatile memory and/or storage elements), at least one input device, and at least one output device. One or more programs that may implement or utilize the GPU virtualization techniques of the present invention, e.g., through the use of a data processing API, reusable controls, or the like, are preferably implemented in a high level procedural or object oriented programming language to communicate with a computer system. However, the program (s) can be implemented in assembly or machine language, if desired. In any case, the language may be a compiled or interpreted language, and combined with hardware implementations.

The methods and apparatus of the present invention may also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, etc., the machine becomes an apparatus for practicing the invention. When implemented on a general-purpose processor, the program code combines with the processor to provide a unique apparatus that operates to invoke the functionality of the present invention. Additionally, any storage techniques used in connection with the present invention may invariably be a combination of hardware and software.

While the present invention has been described in connection with the preferred embodiments of the various figures, it is to be understood that other similar embodiments may be used or modifications and additions may be made to the described embodiment for performing the same function of the present invention without deviating therefrom. For example, while exemplary network environments of the invention are described in the context of a networked environment, such as a peer to peer networked environment, one skilled in the art will recognize that the present invention is not limited thereto, and that the methods, as described in the present application may apply to any computing device or environment, such as a gaming console, handheld computer, portable computer, etc., whether wired or wireless, and may be applied to any number of such computing devices connected via a communications network, and interacting across the network. Furthermore, it should be emphasized that a variety of computer platforms, including handheld device operating systems and other application specific operating systems are contemplated, especially as the number of wireless networked devices continues to proliferate.

While exemplary embodiments refer to utilizing the present invention in the context of a graphics pipeline, the invention is not so limited, but rather may be implemented to virtualize a second specialized processing unit cooperating with a main processor for other reasons as well. Moreover, the invention contemplates the scenario wherein multiple instances of the same version or release of an OS are operating in separate virtual machines according to the invention. It can be appreciated that the virtualization of the invention is independent of the operations for which the GPU is used. It is also intended that the invention applies to all GPU architectures, including but not limited to multiple GPU implementations, as well as multi-GPU embodiments that provide the illusion of a single GPU interface. Still further, the present invention may be implemented in or across a plurality of processing chips or devices, and storage may similarly be effected across a plurality of devices. Therefore, the present invention should not be limited to any single embodiment, but rather should be construed in breadth and scope in accordance with the appended claims.

What is claimed is:

1. A method for processing commands comprising graphics work items in a computing system having a first virtual machine (VM), and a second VM, comprising:
   dividing a real address space of a graphics processing unit (GPU) into at least a first portion and a second portion;
   providing the first VM with a first graphics virtual address space, the first graphics virtual address space being mapped to the first portion of the real address space;
   receiving, by a central processing unit (CPU), a first command to be processed by the GPU, the first command having a first virtual address in the first graphics virtual address space, the first command being originated by the first VM;
   translating, by the CPU, the first virtual address to a corresponding first real address in the first real portion;
   instructing the GPU, by the CPU, to process the first command at the first real address;
   wherein instructing the GPU, by the CPU, to process the first command at the first real address comprises processing, by the GPU, the first command at the first real address;
   providing the second VM with a second graphics virtual address space, the second graphics virtual address space being mapped to the second portion of the real address space;
   receiving, by the CPU, a second command to be processed by the GPU, the second command having a second virtual address in the second graphics virtual address space, the second command being originated by the second VM;
   translating, by the CPU, the second virtual address to a corresponding second real address in the second real portion; and
   instructing the GPU, by the CPU, to process the second command at the second real address;
   wherein instructing the GPU, by the CPU, to process the second command at the second real address comprises processing, by the GPU, the second command at the second real address;
   wherein instructing the GPU, by the CPU, to process the second command at the second real address further comprises compositing, by a compositor, a display image comprising a graphical result of processing the first command, and a graphical result of processing the second command, the compositor having access to the first and second portions of the real address space; and
   wherein instructing the GPU, by the CPU, to process the second command at the second real address further comprises displaying the display image on a display device.

2. The method of claim 1, wherein the real address space of the GPU comprises:
   video memory.

3. The method of claim 2, wherein providing the first VM with a first graphics virtual address space, the first graphics virtual address space being mapped to the first portion of the real address space comprises:
   providing a first subportion of the first graphics virtual address space to a first application executing on the first VM; and
   providing a second subportion of the first graphics virtual address space to a second application executing on the first VM.

4. The method of claim 1, wherein instructing the GPU, by the CPU, to process the first command at the first real address comprises:
   determining that the first command is privileged; and
   processing, by the CPU, the first command based on a set of rules; and wherein
   instructing the GPU, by the CPU, to process the command call at the second real address comprises:
   determining that the second command is non-privileged; and
   instructing the GPU, by the CPU, to process the second command without the CPU processing the second command based on the set of rules.

5. The method of claim 1, wherein the compositor comprises:
   a trusted code base created by a virtual machine monitor component that enables the execution of the first VM and the second VM.

6. The method of claim 1, further comprising:
   processing the output of an untrusted application executing in the first VM including utilizing at least one trusted service executing in a third VM to protect the output.

7. The method of claim 1, wherein translating, by the CPU, the first virtual address to a corresponding first real address in the first real portion comprises:
   allocating a contiguous portion of the real address space of the GPU for the first VM;
   identifying a base register and a limit register for the virtual address space of the first graphics virtual address space based on the contiguous portion of the real address space; and
   translating the first virtual address to the corresponding first real address based on the base register and the limit register.

8. A computing system for processing a command comprising a graphics work item, comprising:
   a central processing unit (CPU);
   a virtual machine (VM);
   a virtual machine monitor (VMM) that supports the VM;
   a graphics processing unit (GPU) having a real address space; and
   a memory bearing instructions that, upon execution by the computing system, cause the computing system to perform operations comprising:
   providing the VM with a virtual graphics address space comprising a page table entry, the virtual graphics address space being mapped to a portion of the real address space;
   trapping, by the VMM, an operation originated by the VM to program the page table entry, the operation comprising the command that comprises the graphics work item;
   mapping, by the CPU, a virtual address of the page table entry to a corresponding real address in the portion of the real address space;
   instructing the GPU, by the CPU, to process the operation to program the page table entry at the real address;
   identifying, by the VMM, a display image comprising a graphical result comprising the result of the GPU processing the operation to program the page table entry, the VMM having access to the portion of the real address space; and
   transmitting, by the VMM, the result to a host operating system for compositing and display on a display device.

9. The computing system of claim 8, wherein the real address space of the GPU comprises: system memory.

10. The computing system of claim 9, wherein providing the VM with a graphics virtual address space, the graphics virtual address space being mapped to the portion of the real address space comprises:
providing a first subportion of the graphics virtual address space to a first application executing in the VM; and
providing a second subportion of the first graphics virtual address space to a second application executing on the VM.

11. The computing system of claim 8, wherein instructing the GPU, by the CPU, to process the operation to program the page table entry at the real address comprises:
determining that the operation to program the page table entry is privileged; and
processing, by the CPU, the operation to program the page table entry based on a set of rules; and further comprising:
instructing the GPU, by the CPU, to process a second operation to program the page table entry at the second real address, comprising:
determining that the second operation to program the page table entry is non-privileged; and
instructing the GPU, by the CPU, to process the second operation to program the page table entry without the CPU processing the second operation to program the page table entry based on the set of rules.

12. The computing system of claim 8, wherein the computing system further comprises:
a host operating system comprising a trusted code base that enables the VM.

13. The computing system of claim 8, the memory further bears instructions that, upon execution by the computing system, cause the computing system to perform operations comprising:
processing, by the VMM, an output of an untrusted application executing in the VM including utilizing at least one trusted service executing in a second VM to protect the output.

14. The computing system of claim 8, wherein the GPU is dedicated to calculating floating point operations.

15. The computing system of claim 8, wherein the VMM is separate from the host operating system.

16. The computing system of claim 8, wherein the memory further bears instructions that, upon execution by the computing system, cause the computing system to perform operations comprising:
transmitting, by the VMM, the first page table entry directly to a graphics pipeline of the GPU.

17. A tangible computer-readable storage medium bearing computer-readable instructions that, upon execution by a computer, cause the computer to perform operations comprising:
dividing a real address space of a graphics processing unit (GPU) into at least a first portion and a second portion;
providing the first VM with a first graphics virtual address space comprising a page table entry, the first graphics virtual address space being mapped to the first portion of the real address space;
trapping, by the VMM, an operation originated by the first VM to program the page table entry, the operation comprising the command that comprises the graphics work item;
mapping, by the CPU, a virtual address of the page table entry to a corresponding first real address in the first real portion;
providing a second VM with a second graphics virtual address space comprising a second page table entry, the second graphics virtual address space being mapped to the second portion of the real address space;
trapping, by the VMM, an operation originated by the second VM to program the page table entry, the operation comprising the command that comprises the graphics work item;
mapping, by the CPU, a second virtual address of the second page table entry to a corresponding second real address in the second real portion;
processing, by the GPU, the first page table entry at the first real address to produce a first graphical result;
processing, by the GPU, the second page table entry at the second real address to produce a second graphical result;
compositing an image comprising the first graphical result and the second graphical result; and
storing the image in a memory.

18. The computer-readable storage medium of claim 17, wherein providing the VM with a graphics virtual address space, the graphics virtual address space being mapped to the first portion of the real address space comprises:
providing a first subportion of the graphics virtual address space to a first application executing in the VM; and
providing a second subportion of the first graphics virtual address space to a second application executing on the VM.

19. The computer-readable storage medium of claim 17, wherein processing the first page table entry comprises:
determining whether the operation to program the first page table entry is privileged or non-privileged, and applying different sets of rules for processing a privileged versus a non-privileged operation to program the first page table entry.

20. The computer-readable storage medium of claim 17, further bearing computer-readable instructions that, upon execution by the computer, cause the computer to perform operations comprising:
compositing the display of the graphical result from a trusted code base created by a virtual machine monitor (VMM) that enables the VM.

21. The computer-readable storage medium of claim 17, further bearing computer-readable instructions that, upon execution by the computer, cause the computer to perform operations comprising:
processing output of an untrusted application executing in the VM including utilizing at least one trusted service executing in a second VM to protect the output.

* * * * *